United States Patent
Black et al.

(10) Patent No.: US 11,146,392 B2
(45) Date of Patent: Oct. 12, 2021

(54) SPLITTING ENCRYPTED KEY AND ENCRYPTION KEY USED TO ENCRYPT KEY INTO KEY COMPONENTS ALLOWING ASSEMBLY WITH SUBSET OF KEY COMPONENTS TO DECRYPT ENCRYPTED KEY

(71) Applicant: tZERO IP, LLC, New York, NY (US)

(72) Inventors: Tron Black, Sandy, UT (US); Denny Becker, Salt Lake City, UT (US); Tyler Perkins, West Jordan, UT (US); Joel Weight, Sandy, UT (US); Jesse Empey, Saratoga Springs, UT (US)

(73) Assignee: tZERO IP, LLC, New York, NY (US)

( * ) Notice: Subject to any disclaimer, the term of this patent is extended or adjusted under 35 U.S.C. 154(b) by 130 days.

(21) Appl. No.: 16/355,527

(22) Filed: Mar. 15, 2019

(65) Prior Publication Data
US 2019/0288834 A1    Sep. 19, 2019

Related U.S. Application Data

(60) Provisional application No. 62/643,653, filed on Mar. 15, 2018, provisional application No. 62/643,655, filed on Mar. 15, 2018.

(51) Int. Cl.
*H04L 9/08*    (2006.01)
*H04L 9/30*    (2006.01)

(52) U.S. Cl.
CPC ............ *H04L 9/085* (2013.01); *H04L 9/0861* (2013.01); *H04L 9/0894* (2013.01); *H04L 9/30* (2013.01)

(58) Field of Classification Search
CPC ..... H04L 9/085; H04L 9/0861; H04L 9/0894; H04L 9/30; H04L 9/0822; H04L 9/0819; H04L 9/0891; H04L 9/3218; H04L 9/3226
See application file for complete search history.

(56) References Cited

U.S. PATENT DOCUMENTS 8,855,318 B1 * 10/2014 Patnala ............... H04L 9/14
380/279
9,673,975 B1 * 6/2017 Machani ............... H04L 9/0863
(Continued)

FOREIGN PATENT DOCUMENTS

KR    1020050104220 A    11/2005

OTHER PUBLICATIONS

"Divide and Manage Secret Data Securely With Shamir's Secret Sharing", Nov. 11, 2017, pp. 1-5.
(Continued)

*Primary Examiner* — J. Brant Murphy
(74) *Attorney, Agent, or Firm* — Fogg & Powers LLC

(57) ABSTRACT

A system includes processor(s) and memory(s). When encryption key(s) need to be generated to encrypt a key, processor(s): securely generate encryption key(s); encrypt key using encryption key(s) to generate encrypted key; split encrypted key and encryption key(s) into set(s) of key components, wherein subset of key components can be used to reconstruct encrypted key and encryption key(s); and securely erase key from memory(s). When encryption key(s) need to be used, processor(s): receive set(s) of key components from subset(s) of users that can be used to reconstruct encrypted key and encryption key(s) used to securely decrypt key from encrypted key; when set(s) of key components is received from subset(s) of users that can be used to reconstruct encrypted key and encrypted key(s), securely reconstruct encrypted key and encryption key(s); and when the encrypted key and the encryption key(s) have both been reconstructed, securely decrypt encrypted key into key using encryption key(s).

29 Claims, 8 Drawing Sheets

(56) References Cited

U.S. PATENT DOCUMENTS

| | | | | |
|---|---|---|---|---|
| 2002/0071566 A1* | 6/2002 | Kurn | ................. | H04L 63/062 380/281 |
| 2004/0039924 A1* | 2/2004 | Baldwin | ................. | H04L 9/0844 713/189 |
| 2004/0042620 A1* | 3/2004 | Andrews | ................. | H04L 9/0894 380/286 |
| 2005/0086471 A1* | 4/2005 | Spencer | ................. | H04L 9/0894 713/165 |
| 2007/0223706 A1* | 9/2007 | Gantman | ................. | H04L 9/085 380/286 |
| 2008/0031460 A1* | 2/2008 | Brookner | ................. | H04L 9/085 380/282 |
| 2009/0122981 A1* | 5/2009 | Kaji | ................. | H04L 9/302 380/45 |
| 2010/0020966 A1* | 1/2010 | Hata | ................. | H04L 9/0861 380/44 |
| 2012/0121088 A1* | 5/2012 | Hata | ................. | H04L 9/0836 380/255 |
| 2013/0219189 A1* | 8/2013 | Simmons | ................. | G06F 21/00 713/189 |
| 2014/0250303 A1* | 9/2014 | Miller | ................. | G06F 21/78 713/171 |
| 2020/0169422 A1* | 5/2020 | Ingraham | ................. | G06F 21/6245 |

OTHER PUBLICATIONS

"Shamir39 Mnemonic Code Splitter", Oct. 3, 2017, pp. 1-3.
"Shamir's Quest: Collect Any 3 Keys to Unlock the Secret!", The blog at the bottom of the sea, Apr. 30, 2016, pp. 1-9.
Armstrong, "How Coinbase Builds Secure Infrastructure to Store Bitcoin in the Cloud", The Coinbase Engineering Blog, Oct. 21, 2017, pp. 1-8.
Gray, "How to split a private key to create a "shared secret" and secure your XRP in the event of death/theft/natural disaster/etc. using Shamir's Secret Sharing Scheme", XRP CHAT, Jul. 5, 2017, pp. 1-14.
International Searching Authority, "International Search Report and Written Opinion from PCT Application No. PCT/US2019/022607 dated Jul. 2, 2019", from Foreign Counterpart to U.S. Appl. No. 16/355,527, pp. 1-14, Published: WO.
Miller, "Simple Security with Shamir Secret Sharing", GridPlus, Aug. 16, 2017, pp. 1-7.
Olimid, "Secret Sharing-based Group Key Establishment", Faculty of Mathematics and Computer Science, 2013, pp. 1-116, University of Bucharest.
Poettering, "What is 'Secret Sharing?'", Shamir's Secret Sharing Scheme, Jan. 2, 2018, pp. 1-3, point-at-infinity.org/ssss/.
Stetsyuk, "Never store your secrets in one place again", PassGuardian, Oct. 26, 2017, pp. 1-4.
Team nChain, "Keys to Secure the Digital Future: nChains's Inventions for Security of Bitcoin, Digital Assets & Digital Resources", nChain, Aug. 3, 2017, pp. 1-7.
Wikipedia, "Shamir's Secret Sharing", Oct. 20, 2017, pp. 1-6.
Flecther-Hill, "Kimono—trustless secret sharing using time-locks on Ethereum", medium.com, May 30, 2018, pp. 1-8.
International Bureau, "International Preliminary Report on Patentability from PCT Application No. PCT/US2019/022607", from Foreign Counterpart to U.S. Appl. No. 16/355,527, dated Sep. 24, 2020, pp. 1 through 11, Published: WO.
Wikipedia, "Secret Sharing", Feb. 19, 2018, pp. 1-8.

* cited by examiner

SPLITTING ENCRYPTED KEY AND
ENCRYPTION KEY USED TO ENCRYPT
KEY INTO KEY COMPONENTS ALLOWING
ASSEMBLY WITH SUBSET OF KEY
COMPONENTS TO DECRYPT ENCRYPTED
KEY

CROSS-REFERENCE TO RELATED
APPLICATIONS

This application claims priority to the following provisional patent application, each of which is hereby incorporated herein by reference:

U.S. Provisional Patent Application Ser. No. 62/643,653 filed on Mar. 15, 2018 and entitled "KEY SPLITTING INTO PLURALITY OF KEY COMPONENTS WITHIN SECURE ENVIRONMENT ALLOWING ASSEMBLY WITH SUBSET OF PLURALITY OF KEY COMPONENTS"; and U.S. Provisional Patent Application Ser. No. 62/643,655 filed on Mar. 15, 2018 and entitled "SPLITTING ENCRYPTED KEY AND ENCRYPTION KEY USED TO ENCRYPT KEY INTO KEY COMPONENTS ALLOWING ASSEMBLY WITH SUBSET OF KEY COMPONENTS TO DECRYPT ENCRYPTED KEY".

BACKGROUND

Cryptography can be used to securely store and transmit data. Keys can be used to encrypt and decrypt data or to sign transactions.

SUMMARY

An example system includes: at least one processor; at least one memory communicatively coupled to the at least one processor; and wherein, when at least one encryption key needs to be generated to encrypt a key, the at least one processor is configured to: generate the at least one encryption key; encrypt the key using the at least one encryption key to generate an encrypted key; split the encrypted key and the at least one encryption key into at least one set of key components, wherein at least a subset of key components of the at least one set of key components can be used to reconstruct the encrypted key and the at least one encryption key; and erase the key from the at least one memory.

An example system includes: at least one processor; at least one memory communicatively coupled to the at least one processor; at least one network interface communicatively coupled to the at least one processor and configured to communicate with external computing devices; and wherein the at least one processor is configured to: generate the private key; generate at least one encryption key; apply at least one exclusive or (XOR) operation to the private key and the at least one encryption key to encrypt the private key using the encryption key to generate an encrypted private key; split the encrypted private key and the at least one encryption key into at least one set of key components, wherein at least a subset of key components of the at least one set of key components can be used to reconstruct the encrypted key and the at least one encryption key; and erase the key from the at least one memory.

An example system includes: at least one processor; at least one memory communicatively coupled to the at least one processor; and wherein when an encryption key needs to be used that is encrypted as an encrypted key, the at least one processor is configured to: receive at least one set of key components from at least a subset of users that can be used to reconstruct the encrypted key and at least one encryption key used to decrypt the key from the encrypted key; when the at least the one set of key components is received from the at least the subset of users that can be used to reconstruct the encrypted key and the at least one encryption key, reconstruct the encrypted key and the at least one encryption key; and when the encrypted key and the at least one encryption key have both been reconstructed, decrypt the encrypted key into the key using the at least one encryption key.

An example system includes: at least one processor; at least one memory communicatively coupled to the at least one processor; at least one network interface communicatively coupled to the at least one processor and configured to communicate with external computing devices; and wherein when a private key needs to be used, the at least one processor is configured to: cause a request for key components to be communicated to users using the at least one network interface; receive at least one set of key components from at least a subset of users that can be used to reconstruct an encrypted private key and at least one encryption key used to decrypt the private key from the encrypted private key; when the at least the one set of key components is received from the at least the subset of users that can be used to reconstruct the encrypted private key and the at least one encryption key, reconstruct the encrypted private key and the at least one encryption key; when the encrypted private key and the at least one encryption key both have been reconstructed, apply at least one exclusive or (XOR) operation to the encrypted private key and the at least one encryption key to decrypt the encrypted private key using the at least one encryption key; and erase the private key from the at least one memory after use.

DRAWINGS

Understanding that the drawings depict only exemplary embodiments and are not therefore to be considered limiting in scope, the exemplary embodiments will be described with additional specificity and detail through the use of the accompanying drawings, in which.

Figure 7:
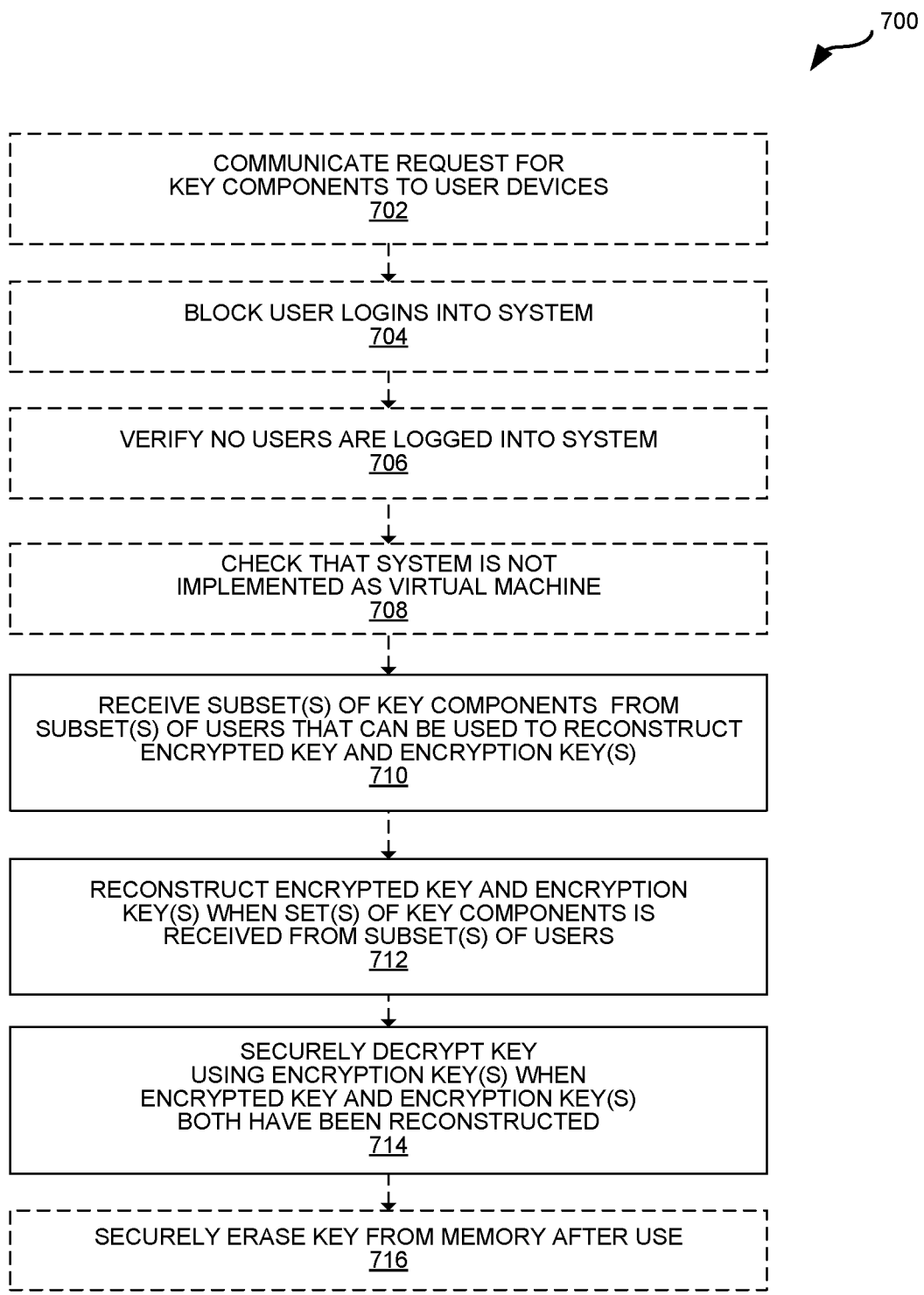
Figure 8:
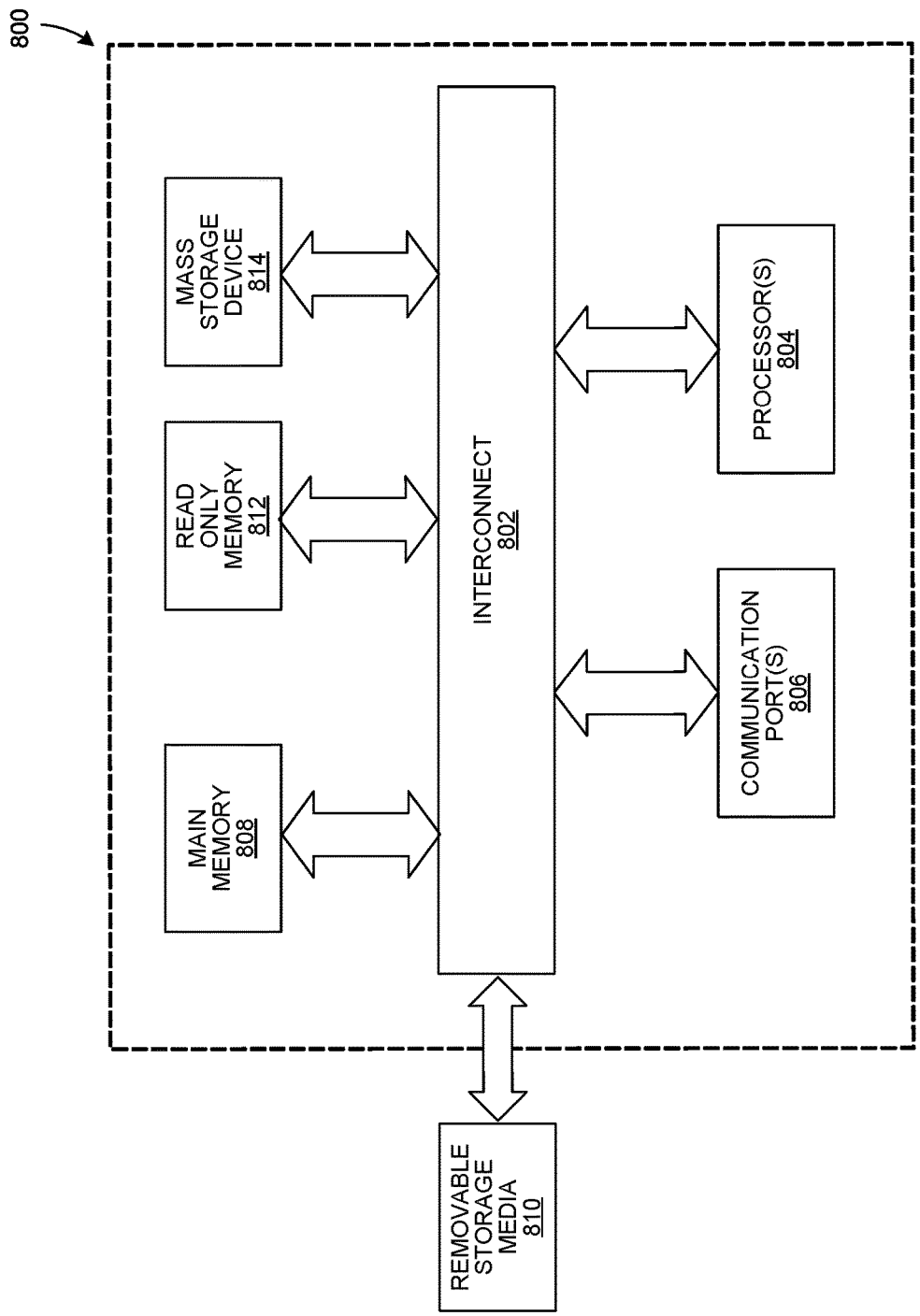

FIG. 7 is a flow diagram of an exemplary method for securely reconstructing both an encrypted key and at least one encryption key from subsets of key components and securely decrypting the encrypted key using the at least one encryption key when both the encrypted key and the at least one encryption key have been reconstructed; and FIG. 8 illustrates an example of a computer system with which some embodiments of the present disclosure may be utilized.

In accordance with common practice, the various described features are not drawn to scale but are drawn to emphasize specific features relevant to the exemplary embodiments.

DETAILED DESCRIPTION

In the following detailed description, reference is made to the accompanying drawings that form a part hereof, and in which is shown by way of illustration specific illustrative embodiments. However, it is to be understood that other embodiments may be utilized and that logical, mechanical, and electrical changes may be made. Furthermore, the method presented in the drawing figures and the specification is not to be construed as limiting the order in which the individual steps may be performed. The following detailed description is, therefore, not to be taken in a limiting sense.

Keys, including cryptographic keys, can be used to encrypt and decrypt data as well as to sign transactions. Keys can include (but are not limited to) private keys, public keys, encryption keys, signing keys, and other cryptographic keys as well as passwords and secrets. In examples, a key may be embodied as a string of characters. In some configurations, one or more Advanced Encryption Standard (AES) keys may be used. An AES key may be used to symmetrically encrypt and/or decrypt data. This is referred to as "symmetric" encryption/decryption because the same key can be used to encrypt and decrypt, e.g., to encrypt and decrypt one or more private keys for different blockchain addresses, accounts, and/or wallets.

In some configurations, a keypair may be used that includes a private key and a public key. In examples, the public key can be used to encrypt data, which can only be decrypted using the private key corresponding to the public key used for encryption. In examples, a public key may be used to generate a transaction address (e.g., in a customer wallet), and only the corresponding private key can be used to sign a transaction that spends funds from the transaction address. This may be referred to as "asymmetric" encryption/decryption because the same key is not used to encrypt and decrypt (or sign transactions). It is generally desirable to keep a private key (and sometimes the public key) secure. However, there is often a tradeoff between keeping keys secure and accessible when needed.

In some instances, it is not desirable to have access to a key limited to a single person. Further, it can also be desirable that more than one person be required to use a key. In examples, this could be useful in cases where multiple directors, officers, partners, and/or employees of an organization are required to participate when a key is used. Keys can be split into multiple parts where a subset of the parts can be used to reconstruct the keys. In examples, the generation of the components of the key can be configured to require a particular quantity of components be required to reconstruct a particular key. For example, a particular key may be split up into N key components, such that M of the N key components are required to reconstruct the particular key. In examples, the N key components can be distributed to various users. In examples, the key components can be electronically distributed to the devices of the users using at least one of email, Short Message Service (SMS), Multimedia Messaging Service (MMS), instant messaging, push notification (such as a push verify notification), by polling (or pulling) a notification, or by Bluetooth, Wi-Fi, or near field communication (NFC) transmission. In examples, the key components can be displayed on a screen and written down or otherwise physically distributed through printing (such as into a Quick Response (QR) code, barcode, etc.) or stored on USB keys/memory sticks (or other solid state drives), or optical or magnetic disks. In examples, the key is split into the set of key components through at least one of polynomial interpolation or Shamir secret sharing.

In one configuration, an additional layer of security and flexibility can be added by using at least one encryption key (along with the key itself) to encrypt the key into an encrypted key and split apart both the encrypted key and the at least one encryption key into components such that both require a subset of key components to be reconstructed. The key components for both the encrypted key and the at least one encryption key are provided to groups of people. While the key components for the key and the encryption key could be provided to the same group of people, the groups of people could also be mutually exclusive or merely overlapping. Splitting both the encrypted key and the at least one encryption key means that collusion among the different part holders is required to maliciously reconstruct the key and encryption key. In examples, more than one of the components could be provided to the same person or entity. In examples, each component could be provided to different persons or entities.

Accordingly, the present systems and methods improve systems requiring multiple individuals/entities to hold components of keys where a number of the components are required in order to perform an action. Specifically, the present systems and methods improve such systems by securely generating and distributing the different keys/key components in a way that minimizes the possibility of malicious attacks because M of N key components are required and, therefore, collusion between at least M part holders would be required to reconstruct the encrypted key and/or encryption key for an unauthorized purpose, while still making the encrypted key and/or encrypted key accessible when needed.

Furthermore, some configurations of the present systems and methods are more secure than conventional key splitting because the components of the encrypted key are encrypted before distribution to part holders. Therefore, even if the key components for the encrypted key are intercepted, the encrypted key could only be reconstructed if the encryption key is also reconstructed based on the encryption key components. In other words, the additional layer of encryption with the encryption key and splitting reduces the possibility of a malicious actor reconstructing the asset encryption key without getting enough components parts from both the encrypted key and the encryption key.

Figure 1:
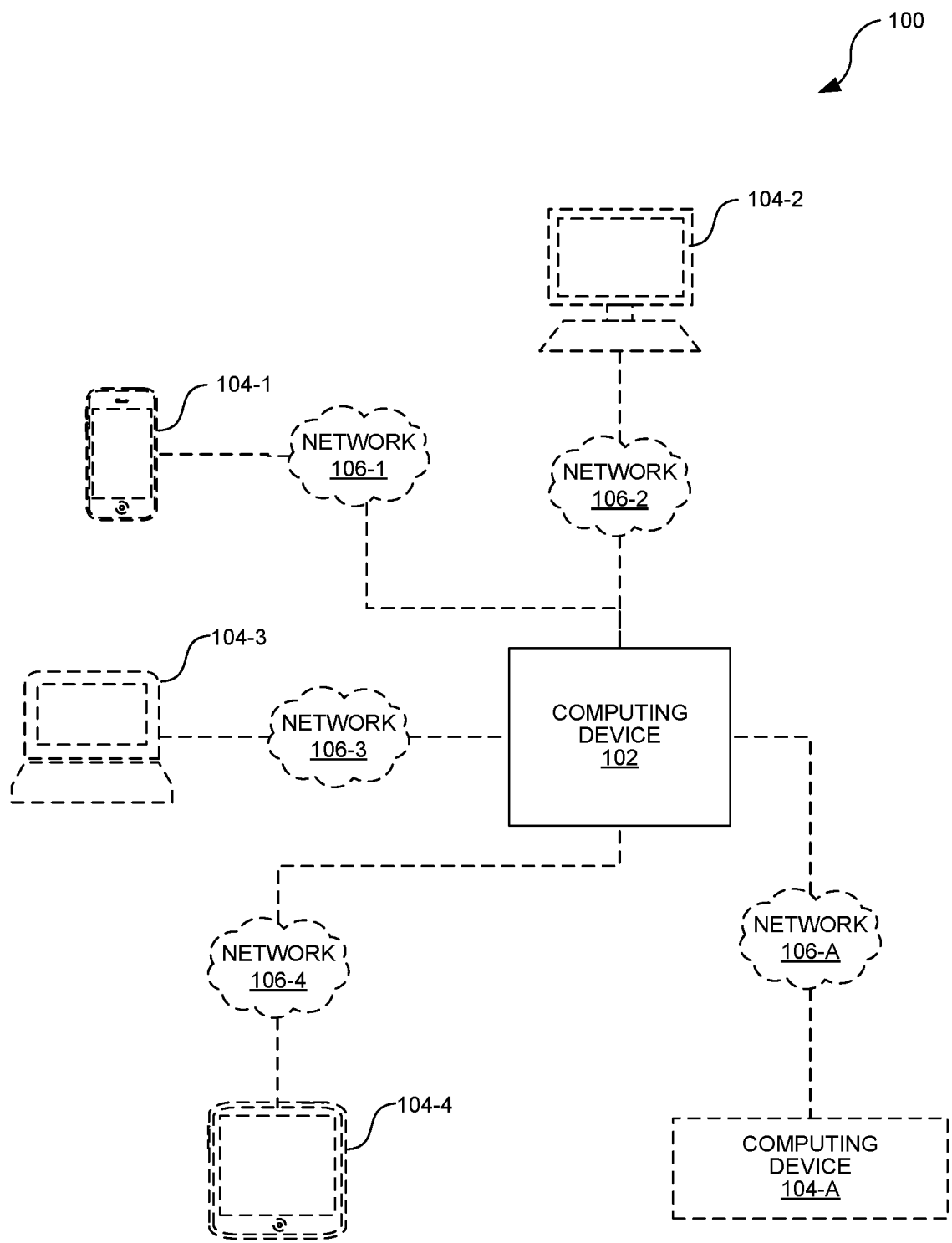
FIG. 1 is block diagram of an example system for securely generating, splitting, and/or reconstructing keys.

FIG. 1 is block diagram of an example system 100 for securely generating, splitting, and/or reconstructing keys. System 100 includes a computing device 102 and a plurality of optional computing devices 104 (such as optional computing devices 104-1 through optional computing devices 104-A). Each of computing device 102 and computing devices 104 can be implemented as any of a mobile computing device, such as a mobile phone, tablet computer, mobile media device, mobile gaming device, laptop computer, vehicle-based computer, etc.; or a non-mobile device such as a dedicated terminal, a public terminal, a kiosk, a server, or a desktop computer. Each computing device 104 is communicatively coupled to the computing device 102 using at least one network 106 (such as network 106-1 through network 106-A). In examples, the at least one network 106 includes at least one wired network and/or at least one wireless network. In examples, any combination of wired and wireless networks is used to couple the computing devices 104 to the computing device 102. In examples, the at least one network 106 includes at least one of at least one local area network (LAN), at least one wide area network (WAN), or the Internet. In examples, any combination of local area networks, wide area networks, or the Internet is used as the at least one network 106 to couple the computing devices 104 to the computing device 102. In examples, each of computing device 102 and computing devices 104 includes at least one memory, at least one processor, at least one optional network interface, at least one optional display device, at least one optional input device, and at least one power source.

Figure 2:
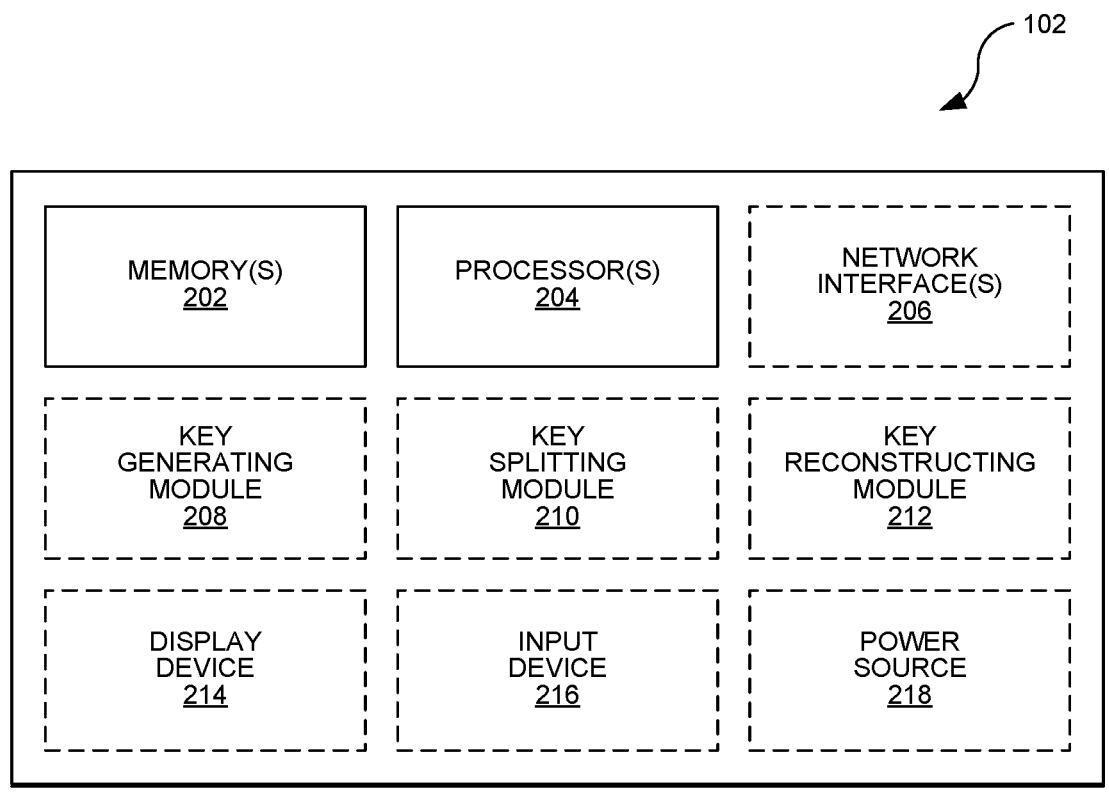
FIG. 2 is a block diagrams of an example computing device used in the system of FIG. 1 for securely generating, splitting and/or reconstructing keys.
Figure 3:
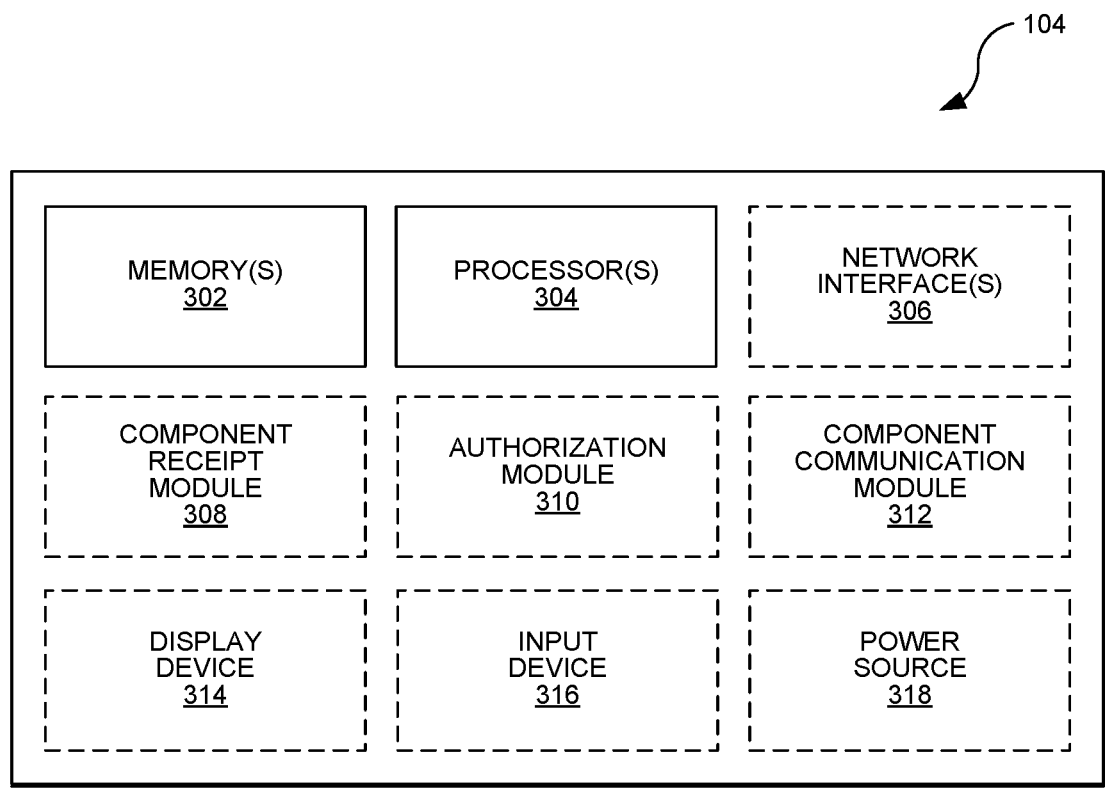
FIG. 3 is a block diagrams of another example computing device used in the system of FIG. 1 for securely generating, splitting and/or reconstructing keys.

FIGS. 2 and 3 are block diagrams of example computing devices. FIG. 2 is a block diagram of an example computing device 102 used in system 100 for securely generating, splitting and/or reconstructing keys. Computing device 102 includes at least one memory 202, at least one processor 204, optional at least one network interface 206, optional key generating module 208, optional key splitting module 210, optional key reconstructing module 212, optional display device 214, optional input device 216, and optional power source 218. FIG. 3 is a block diagram of an example computing device 104 used in system 100 for securely generating, splitting and/or reconstructing keys. Computing device 104 includes at least one memory 302, at least one processor 304, optional at least one network interface 306, optional component receipt module 308, optional authorization module 310, optional component communication module 312, optional display device 314, optional input device 316, and optional power source 318.

In examples, the at least one memory 202 and/or the at least one memory 302 can be any device, mechanism, or populated data structure used for storing information. In examples, the at least one memory 202 and/or the at least one memory 302 can be or include any type of volatile memory, nonvolatile memory, and/or dynamic memory. For example, the at least one memory 202 and/or the at least one memory 302 can be random access memory, memory storage devices, optical memory devices, magnetic media, floppy disks, magnetic tapes, hard drives, erasable programmable read-only memories (EPROMs), electrically erasable programmable read-only memories (EEPROMs), optical media (such as compact discs, DVDs, Blu-ray Discs) and/or the like. In accordance with some embodiments, the at least one memory 202 and/or the at least one memory 302 may include one or more disk drives, flash drives, one or more databases, one or more tables, one or more files, local cache memories, processor cache memories, relational databases, flat databases, and/or the like. In addition, those of ordinary skill in the art will appreciate many additional devices and techniques for storing information which can be used as the at least one memory 202 and/or the at least one memory 302. The at least one memory 202 and/or the at least one memory 302 may be used to store instructions for running one or more applications or modules on the at least one processor 204 and/or the at least one processor 304. For example, the at least one memory 202 could be used in one or more examples to house all or some of the instructions needed to execute the functionality of the optional key generating module 208, optional key splitting module 210, and optional key reconstructing module 212. Similarly, the at least one memory 302 could be used in one or more examples to house all or some of the instructions needed to execute the functionality of the optional component receipt module 308, the optional authorization module 310, and the optional component communication module 312.

The at least one processor 204 and/or the at least one processor 304 can be any known processor, such as a general purpose processor (GPP) or special purpose (such as a field-programmable gate array (FPGA), application-specific integrated circuit (ASIC) or other integrated circuit or circuitry), or any programmable logic device. In examples, any of the at least one key generating module 208, key splitting module 210, and/or key reconstructing module 212 are implemented by the at least one processor 204 and the at least one memory 202. In examples, any of the at least one component receipt module 308, authorization module 310, and/or component communication module 312 are implemented by the at least one processor 304 and the at least one memory 302.

In examples, the at least one optional network interface 206 and/or the at least one optional network interface 206 includes or is coupled to at least one optional antenna for communication with a network (such as one of the at least one networks 106 of system 100). In examples, the at least one optional network interface 306 includes or is coupled to at least one optional antenna for communication with a network (such as one of the at least one networks 106 of system 100). In examples, the at least one optional network interface 206 and/or the at least one optional network interface 206 includes at least one of an Ethernet interface, a cellular radio access technology (RAT) radio, a Wi-Fi radio, a Bluetooth radio, or a near field communication (NFC) radio. In examples, the at least one optional network interface 206 and/or the at least one optional network interface 206 includes a cellular radio access technology radio configured to establish a cellular data connection (mobile internet) of sufficient speeds with a remote server using a local area network (LAN) or a wide area network (WAN). In examples, the cellular radio access technology includes at least one of Personal Communication Services (PCS), Specialized Mobile Radio (SMR) services, Enhanced Special Mobile Radio (ESMR) services, Advanced Wireless Services (AWS), Code Division Multiple Access (CDMA), Global System for Mobile Communications (GSM) services, Wideband Code Division Multiple Access (W-CDMA), Universal Mobile Telecommunications System (UMTS), Worldwide Interoperability for Microwave Access (WiMAX), 3rd Generation Partnership Projects (3GPP) Long Term Evolution (LTE), High Speed Packet Access (HSPA), third generation (3G) fourth generation (4G), fifth generation (5G), etc. or other appropriate communication services or a combination thereof. In examples, the at least one optional network interface 206 and/or the at least one optional network interface 206 includes a Wi-Fi (IEEE 802.11) radio configured to communicate with a wireless local area network that communicates with the remote server, rather than a wide area network. In examples, the at least one optional network interface 206 and/or the at least one optional network interface 206 includes a near field radio communication device that is limited to close proximity communication, such as a passive near field communication (NFC) tag, an active near field communication (NFC) tag, a passive radio frequency identification (RFID) tag, an active radio frequency identification (RFID) tag, a proximity card, or other personal area network device. In examples, the same at least one optional network interface 206 and/or the at least one optional network interface 206 is also used for communication with an external gateway device to a network (such as an NFC payment terminal).

In examples, the optional at least one display device 214 and/or the optional at least one display device 314 includes at least one of a light emitting diode (LED), a liquid crystal display (LCD), a light emitting diode (LED) display, an organic light emitting diode (OLED) display, an e-ink display, a field emission display (FED), a surface-conduction electron-emitter display (SED), or a plasma display. In examples, the optional at least one input device 216 include at least one of a touchscreen (including capacitive and resistive touchscreens), a touchpad, a capacitive button, a mechanical button, a switch, a dial, a keyboard, a mouse, a camera, a biometric sensor/scanner, etc. In examples, the optional at least one display device 214 and/or the optional at least one display device 314 and the optional at least one input device 216 are combined into a human machine interface (HMI) for user interaction with the computing device 102.

In examples, at least one optional power source 218 is used to provide power to the various components of the network node 102. In examples, at least one optional power source 318 is used to provide power to the various components of the network node 104.

The at least one processor 204 of the computing device 102 is configured to securely generate at least one key. In examples, this is implemented in the key generating module 208. The at least one processor 204 of the computing device 102 may be configured to securely generate the at least one key randomly. In examples, the at least one processor 204 of the computing device 102 may implement a key generator to securely generate the at least one key. In examples, the key generator includes at least one of linear feedback shift register (LFSR), Solitaire cipher, and/or Pontifex cipher. In examples, the at least one processor 204 of the computing device 102 is configured to generate the at least one key by generating a sequence having many pseudo-random characteristics. In examples, the key can be used to encrypt and/or decrypt data. To enable secure generation of the at least one key, the at least one processor 204 may be configured to generate at least one key by first verifying that no users are logged into the computing device 102. To enable secure generation of the at least one key, the at least one processor 204 may be configured to check that the computing device 102 is not being implemented as a virtual machine. To enable secure generation of the at least one key, the at least one processor 204 may be configured to block user logins into the system.

The at least one processor 204 is further configured to split the key into a set of key components where at least one subset of the key components can be used to reconstruct the key. In examples, this is implemented in the key splitting module 210. In examples, the split of the key into the set of key components is configurable, such that a particular quantity of key components may be required to reconstruct the key. For example, a particular key may be split up into N key components, such that M of the N key components are required to reconstruct the particular key. In examples, the key components are distributed to various users. In examples, the key components can be electronically distributed to user devices using the at least one network interface 206, such as by at least one of email, Short Message Service (SMS), Multimedia Messaging Service (MMS), instant messaging, push notification, or push verify notification. In examples, the key is split into the set of key components through at least one of polynomial interpolation or Shamir secret sharing. In examples, the key components can be displayed, printed, or otherwise fixed on a medium provided to users that could then input the key component into their corresponding computing device 104.

In examples, an additional layer of security and flexibility can be added by using at least one encryption key along with the key to encrypt the key itself into an encrypted key and split apart both the encrypted key itself and the at least one encryption key such that both require a subset of key components to be reconstructed. In examples, the at least one processor 204 is configured to encrypt the key by applying at least one exclusive or (XOR) operation to the key and the at least one encryption key. In examples, the encrypted key is configured to include a one in each bit position where bits in a corresponding bit position in both the key and the at least one encryption key are different; and the encrypted key is configured to include a zero in each bit position where bits in the corresponding bit position in both the key and the at least one encryption key are the same. In examples where the at least one encryption key includes a plurality of encryption keys, the a least one processor 204 is configured to apply a first exclusive or (XOR) between the key and the first of the plurality of encryption keys, then a second exclusive or (XOR) between the result of the first XOR and a second of the plurality of encryption keys, and so forth until all of the plurality of encryption keys have been used. In examples, only one encryption key is used by the at least one processor 204 to encrypt the key itself before the key itself and the encryption key are split and provided to various users. In examples, a plurality of encryption keys are used by the at least one processor 204 to encrypt the key itself before the key itself and the plurality of encryption keys are split and provided to various users. In examples, they key components for both the encrypted key itself and the at least one encryption key are provided to groups of people. While the key components for the at least one encryption key and the encrypted key could be provided to the same group of people, the two groups of people could also be mutually exclusive or merely overlapping.

In examples, the at least one processor 204 is configured to combine the encrypted key and the at least one encryption key together before splitting the encrypted key and the at least one encryption key into the at least one set of key components that can be provided to a plurality of users. For example, the at least one processor 204 can be configured to concatenate the encrypted key and the at least one encryption key together into a string and then split the string into the at least one set of key components that can be provided to a plurality of users. In examples, the at least one processor 204 can be configured to split apart the encrypted key and the at least one set of key components into separate sets of key components that can be provided to a plurality of users. For example, the at least one processor 204 can be configured to split the encrypted key into a first set of key components that can be provided to a first plurality of users, wherein at least a first subset of the first key components can be used to reconstruct the encrypted key. Similarly, the at least one processor 204 can be configured to split each encryption key of the at least one encryption key into at least second key components that can be provided to at least a second plurality of users, wherein at least a second subset of the at least the second key components can be used to reconstruct the at least one encryption key.

In examples, the at least one processor 304 for a computing device 104 for a user is configured to receive key components generated by the computing device 102 and configured to store the key component in the at least one memory 302. In exemplary embodiments, this is implemented in the component receipt module 308. In examples, the at least one processor 304 of the computing device 104 is configured to securely receive at least one key component via the at least one network interface 306 (such as being received electronically from the computing device 102). In examples, the key components can be electronically received at the computing device 104 using the at least one network interface 306, such as by at least one of email, Short Message Service (SMS), Multimedia Messaging Service (MMS), instant messaging, push notification, or push verify notification. In examples, the at least one processor 304 of the computing device is configured to receive at least one key component via the at least one input device 316 (such as being manually entered into the system 106 by a user). In examples, the key components can be input manually input into the computing device 104 using the input device 316, such as by a touchscreen, keyboard, mouse, or a media reader. To enable secure receipt of the at least one key component, the at least one processor 304 may be configured to: receive the at least one key component only after verifying that no users are logged into the computing device 104; check that the computing device 104 is not being implemented as a virtual machine; and block other user logins into the computing device 104.

In examples, the at least one processor 204 of the computing device 102 is further configured to reconstruct the key from a set of key components where at least one subset of the key components can be used to reconstruct the key. In examples, this is implemented in the key reconstructing module 212. In examples, the at least one processor 204 is configured to transmit a request to a plurality of computing devices 104 for a plurality of users to provide key components so that the key can be reconstructed. In examples, the request can be electronically transmitted from the computing device 102 using the at least one network interface 206, such as by at least one of email, Short Message Service (SMS), Multimedia Messaging Service (MMS), instant messaging, push notification, or push verify notification.

In examples, the at least one processor 204 is configured to receive at least one subset of the key components from a plurality of users, where the subset of the set of key components can be used to reconstruct the key. In examples, the at least one processor 204 is configured to securely reconstruct the key when the subset of the set of key components is received from the plurality of users. In examples, at least some of the subset of key components is received from the plurality of users via the at least one network interface 206 (such as being received electronically from user devices, such as a computing device 104). In examples, at least some of the subset of key components is received from the plurality of users via the at least one input device 216 (such as being manually entered into the system 104 by users).

In examples, the at least one processor 304 of a computing device 104 for a user is configured to receive a request from the computing device 102 for users to provide key components so that the key can be reconstructed. In examples, the request can be electronically received at the computing device 104 using the at least one network interface 306, such as by at least one of email, Short Message Service (SMS), Multimedia Messaging Service (MMS), instant messaging, push notification, or push verify notification. In examples, the at least one processor 304 is configured to cause the display device 314 to display the request for users to provide key components so that the key can be reconstructed. In examples, the at least one processor 304 is configured to receive user input via the display device 314. In examples, the user input is a response confirming or declining the request (such as using a push verify notification) where they system can access the key component from the at least one memory 302 and communicate it to the computing device 102 in response to the user confirming the request or provide a message back to the computing device 102 in response to the user declining the request. In examples, the user input is the actual key component itself (such as manual entry of the key component using the input device 316) which can then be communicated to the computing device 102.

In examples, an additional layer of security is provided by keys split to various users which can help with the situation where some or all of the key subsets become lost, comprised, etc. without having the change the key itself. In examples, it may make sense to generate a new set of key components to be provided to individuals when key subsets are lost, compromised, etc. or when the group of individuals who have the key subsets should be changed (such as when an executive, other employee, or director departs or changes their position). In such cases, a sufficient quantity of key components are received back at the at least one processor 204 and the at least one processor 204 is configured to regenerate the key itself or the encrypted key and any encryption keys necessary to decrypt the encrypted key into the key itself where the at least one processor 204 is configured to decrypt the encrypted key using any required encryption keys to obtain the key. One or more new encryption keys can be generated and used to encrypt the key. The key and the one or more new encryption keys can be split apart as described above into components and the components provided to one or more groups of people as desirable.

In examples, the at least one set of key components includes a single set of key components and the at least one processor 204 is configured to reconstruct the encrypted key and the at least one encryption key at least in part by being configured to: reconstruct a combined string, including both the encrypted key and the at least one encryption key, from the single set of key components; and extract the encrypted key and the at least one encryption key from the combined string to be used to securely decrypt the encrypted key into the key using the at least one encryption key. In examples, the at least one processor 204 is configured to receive the at least one subset of key components from the at least one subset of users that can be used to reconstruct the encrypted key and the at least one encryption key at least in part by being configured to: receive a first subset of a first set of key components from a first subset of users that can be used to reconstruct the encrypted key; and receive at least a second subset of key components of at least a second set of key components from at least a second subset of users that can be used to reconstruct at least one encryption key used to securely decrypt the key from the encrypted key. In some of these examples, the at least one processor 204 is configured to reconstruct the encrypted key and the at least one encryption key at least in part by being configured to: when the first subset of the first key components is received from the first subset of users, securely reconstruct the encrypted key; and when the at least the second subset of key components of the at least the second key components is received from the at least the second subset of users, securely reconstruct the at least one encryption key. In examples, the at least one processor 204 is configured to decrypt the encrypted key using the at least one encryption key at least in part by applying at least one exclusive or (XOR) operation to the encrypted private key and the at least one encryption key to securely. In examples, the at least one processor is configured to securely erase the private key from the at least one memory after use.

Figure 4:
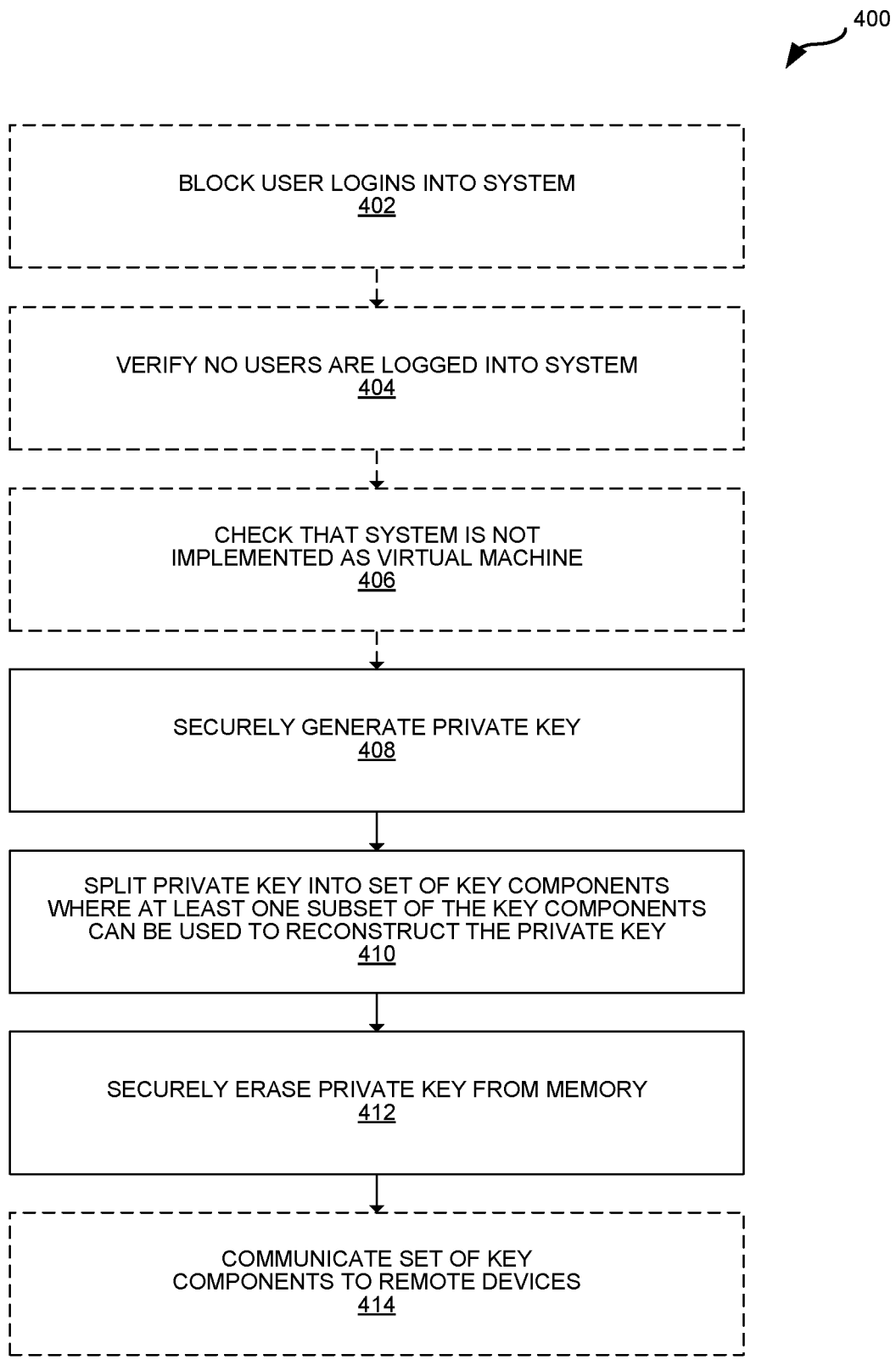
FIG. 4 is a flow diagram of an exemplary method for securely generating and splitting a key into a plurality of key components.

FIG. 4 is a flow diagram of an example method 400 for securely generating and splitting a key (such as a private key used in asymmetrical cryptography). Example method 400 begins at optional block 402 with optionally blocking user logins into the system. In examples, blocking user logins into the system occurs at least in part by blocking secure shell (SSH) logins and/or any other access into the system. Example method 400 proceeds to optional block 404 with optionally verifying that no users are logged into a system. Example method 400 proceeds to optional block 406 with optionally checking that the system is not implemented as a virtual machine. Example method 400 proceeds to block 408 with securely generating a key (such as a private key used in asymmetrical cryptography). Example method 400 proceeds to block 410 with splitting the key into a set of key components where at least one subset of the key components can be used to reconstruct the key. Example method 400 proceeds to block 412 with securely erasing the key from memory. In examples, securely erasing the key from the key from memory using a DoD memory wipe. Example method 400 proceeds to optional block 414 with optionally communicating the set of key components to remote devices 414. In examples, the set of key components are communicated to users in at least one of email, Short Message Service (SMS), Multimedia Messaging Service (MMS), instant messaging, push notification, or push verify notification.

Figure 5:
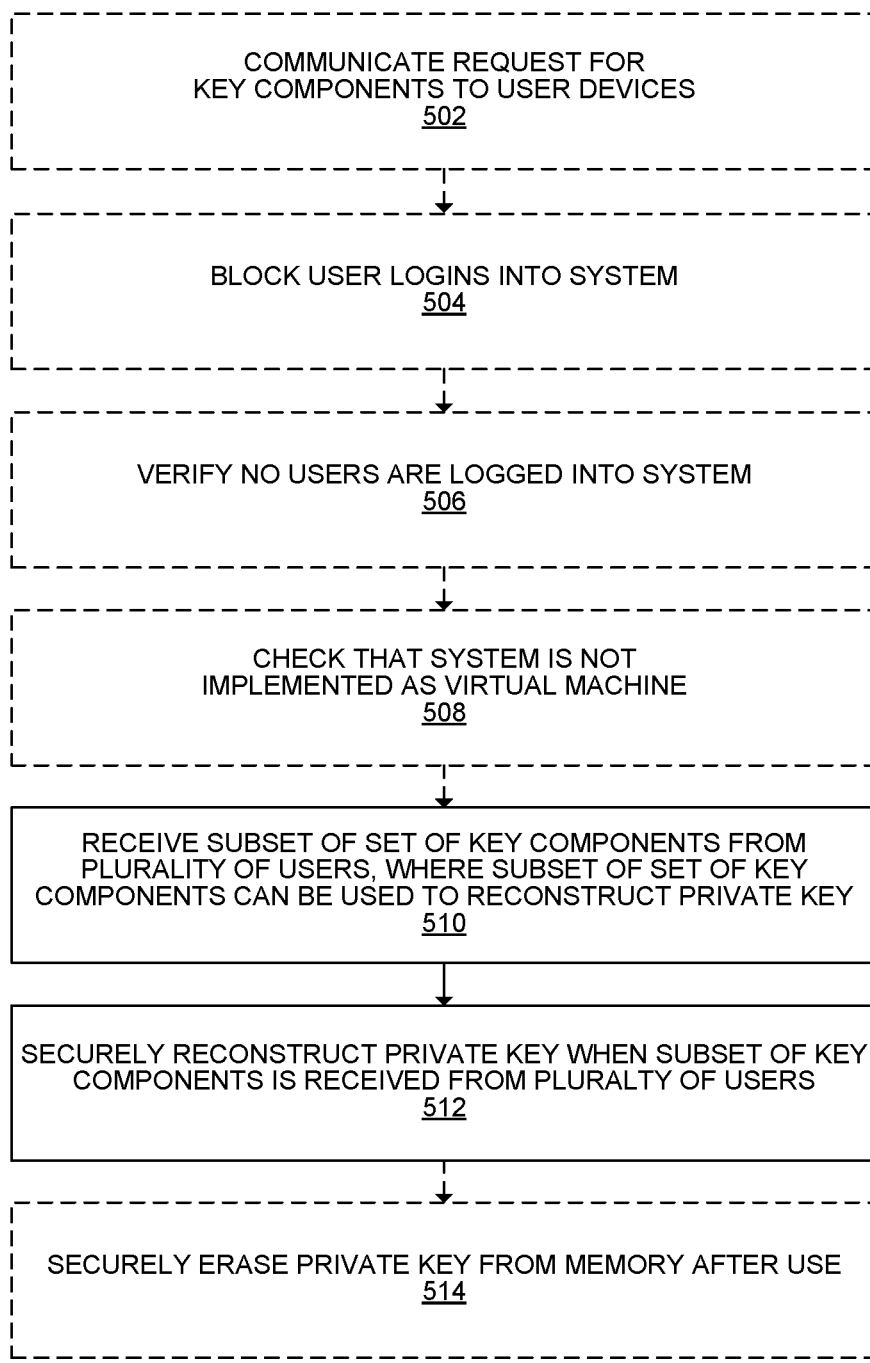
FIG. 5 is a flow diagram of an exemplary method for securely reconstructing a key from a subset of key components.

FIG. 5 is a flow diagram of an example method 500 for securely reconstructing a key (such as a private key used in asymmetrical cryptography) from a subset of key components. Example method 500 begins at optional block 502 with optionally communicating a request for key components to user devices. Example method 500 proceeds to optional block 504 with optionally blocking user logins into a system. Example method 500 proceeds to optional block 506 with optionally verifying that no users are logged into the system. Example method 500 proceeds to optional block 508 with optionally checking that the system is not implemented as a virtual machine. Example method 500 proceeds to block 510 with receiving a subset of a set of key components from a plurality of users where the subset of the set of key components can be used to reconstruct the key. Example method 500 proceeds to block 512 with securely reconstructing the key when the subset of key components is received from the plurality of users. Example method 500 proceeds to optional block 514 with optionally securely erasing the key from memory after use.

Figure 6:
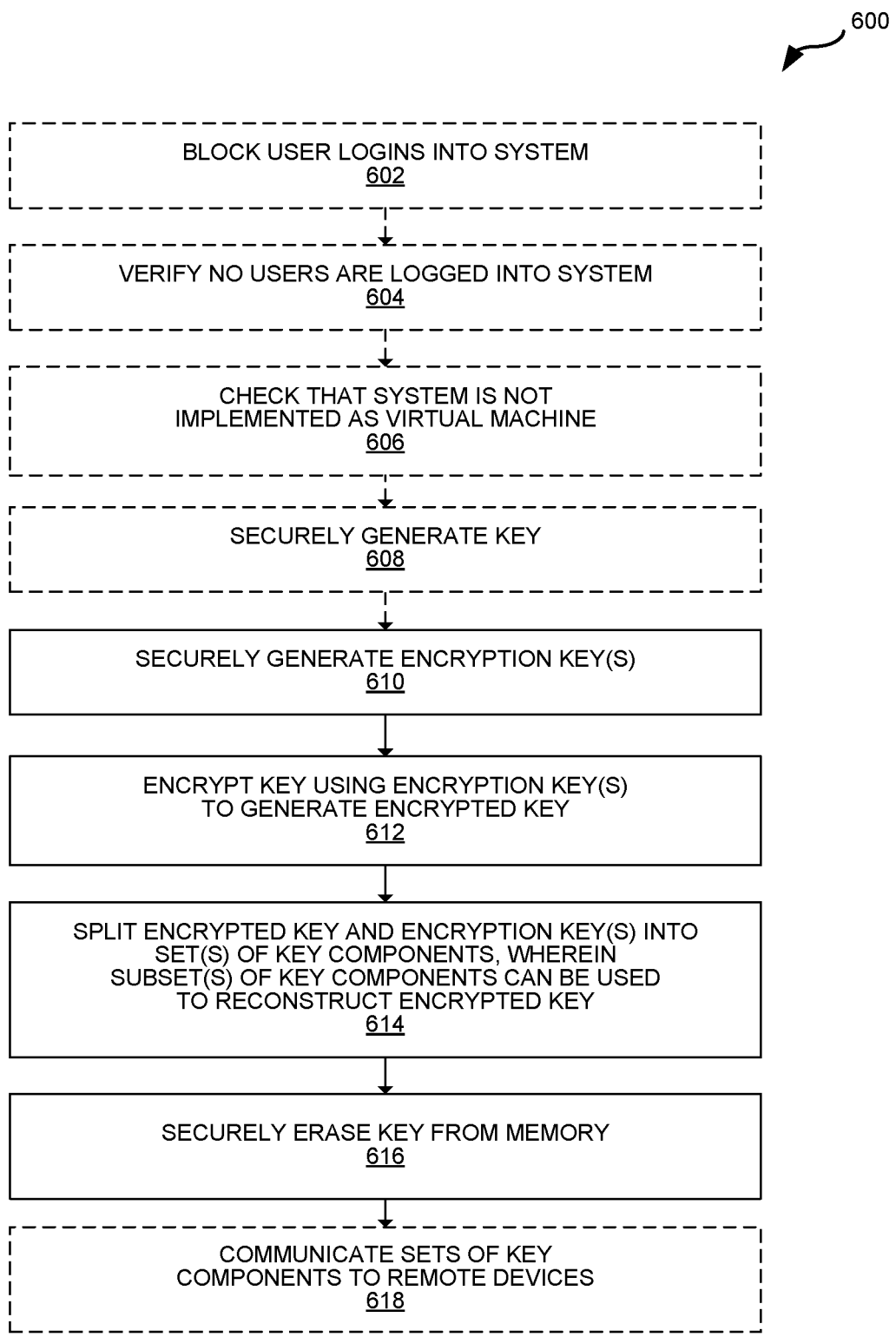
FIG. 6 is a flow diagram of an exemplary method for securely generating at least one encryption key, using the at least one encryption key to encrypt a key into an encrypted key, and splitting the encrypted key and the at least one encryption key into a plurality of key components.

FIG. 6 is a flow diagram of an example method 600 for securely generating at least one encryption key, using the at least one encryption key to encrypt a key (such as a private key, a public key, an encryption key, a signing key, or another cryptographic key or a password or secret) into an encrypted key, and splitting the encrypted key and the at least one encryption key into a plurality of key components. Example method 600 begins at optional block 602 with optionally blocking user logins into a system. Example method 600 proceeds to optional block 604 with optionally verifying that no users are logged into a system. Example method 600 proceeds to optional block 606 with optionally checking that the system is not implemented as a virtual machine. Example method 600 proceeds to optional block 608 with optionally securely generating a key (such as a private key, a public key, an encryption key, a signing key, or another cryptographic key or a password or secret).

Example method 600 proceeds to block 610 with securely generating at least one encryption key. Example method 600 proceeds to block 612 with encrypting the key using the at least one encryption key to generate an encrypted key. In examples, the key is encrypted by applying at least one exclusive or (XOR) operation to the key and the at least one encryption key. In examples, the encrypted key is configured to include a one in each bit position where bits in a corresponding bit position in both the key and the at least one encryption key are different; and the encrypted key is configured to include a zero in each bit position where bits in the corresponding bit position in both the key and the at least one encryption key are the same. In examples where the at least one encryption key includes a plurality of encryption keys, a first exclusive or (XOR) can be applied between the key and the first of the plurality of encryption keys, then a second exclusive or (XOR) between the result of the first XOR and a second of the plurality of encryption keys, and so forth until all of the plurality of encryption keys have been used.

Example method 600 proceeds to block 614 with splitting the encrypted key and the at least one encryption key into at least one set of key components, wherein at least a subset of key components of the at least one set of key components can be used to reconstruct the encrypted key and the at least one encryption key. In examples, the encrypted key and the at least one encryption key are combined together before splitting the encrypted key and the at least one encryption key into the at least one set of key components that can be provided to a plurality of users. For example, the encrypted key and the at least one encryption key can be concatenated together into a string that is then split into at the at least one set of key components that can be provided to a plurality of users. In examples, the encrypted key and the at least one set of key components can be split apart into separate sets of key components that can be provided to a plurality of users. For example, the encrypted key can be split into a first set of key components that can be provided to a first plurality of users, wherein at least a first subset of the first key components can be used to reconstruct the encrypted key. Similarly, each encrypted key of the at least one encryption key can be split into at least second key components that can be provided to at least a second plurality of users, wherein at least a second subset of the at least second key components can be used to reconstruct the at least one encryption key.

Example method 600 proceeds to block 616 with securely erasing the key, the at least one encryption key, and/or the encrypted key from memory. In examples, example method 600 proceeds to optional block 618 with optionally communicating sets of key components to remote devices. In examples, the sets of key components are securely communicated to users in at least one of email, Short Message Service (SMS), Multimedia Messaging Service (MMS), instant messaging, push notification, push verify notification, polling a notification, pulling a notification, or by Bluetooth, Wi-Fi, or near field (NFC) transmission.

FIG. 7 is a flow diagram of an example method 700 for securely reconstructing bon an encrypted key and at least one encryption key from subsets of key components and securely decrypting the encrypted key using the at least one encryption key when both the encrypted key and the at least one encryption key have been reconstructed. Example method 700 begins at block 702 with optionally communicating a request for key components to user devices. In exemplary embodiments, the request for key components is securely communicated to users in at least one of email, Short Message Service (SMS), Multimedia Messaging Service (MMS), instant messaging, push notification, push verify notification, polling a notification, pulling a notification, or by Bluetooth, Wi-Fi, or near field (NFC) transmission.

Example method 700 proceeds to optional block 704 with optionally blocking user logins into the system. Example method 700 proceeds to optional block 706 with optionally verifying that no users are logged into a system. Example method 700 proceeds to optional block 708 with optionally checking that the system is not implemented as a virtual machine. Example method 700 proceeds to optional block 710 with receiving at least one subset of key components from at least one subset of users that can be used to reconstruct the encrypted key and the at least one encryption key. Example method 700 proceeds to block 712 with reconstructing the encrypted key and the at least one encryption key when at least one set of key components is received from at least one subset of users that can be used to reconstruct the encrypted key and the at least one encryption key. In examples, the at least one set of key components includes a single set of key components and reconstructing the encrypted key and the at least one encryption key includes: reconstructing a combined string, including both the encrypted key and the at least one encryption key, from the single set of key components; and extracting the encrypted key and the at least one encryption key from the combined string to be used to securely decrypt the encrypted key into the key using the at least one encryption key.

In examples, receiving the at least one subset of key components from the at least one subset of users that can be used to reconstruct the encrypted key and the at least one encryption key includes: receiving a first subset of a first set of key components from a first subset of users that can be used to reconstruct the encrypted key; and receiving at least a second subset of key components of at least a second set of key components from at least a second subset of users that can be used to reconstruct at least one encryption key used to securely decrypt the key from the encrypted key. In some of these examples, securely reconstructing the encrypted key and the at least one encryption key includes: when the first subset of the first key components is received from the first subset of users, securely reconstructing the encrypted key; and when the at least the second subset of key components of the at least the second key components is received from the at least the second subset of users, securely reconstructing the at least one encryption key. Example method 700 proceeds to block 716 with optionally securely erasing the key, the encrypted key, and/or the at least one encryption key after use.

The techniques introduced here can be embodied as special-purpose hardware (such as circuitry), as programmable circuitry appropriately programmed with software and/or firmware, or as a combination of special-purpose and programmable circuitry. Hence, embodiments may include a machine-readable medium having stored thereon instructions that may be used to program a computer (or other electronic devices) to perform a process. The machine-readable medium may include, for example, floppy diskettes, optical disks, compact disc read-only memories (CD-ROMs), magneto-optical disks, read-only memories (ROMs), random access memories (RAMs), erasable programmable read-only memories (EPROMs), electrically erasable programmable read-only memories (EEPROMs), magnetic or optical cards, flash memory, or other type of media/machine-readable medium suitable for storing electronic instructions.

Computer System Overview

Embodiments of the present disclosure include various steps and operations, which have been described above. A variety of these steps and operations may be performed by hardware components or may be embodied in machine-executable instructions, which may be used to cause a general-purpose or special-purpose processor programmed with the instructions to perform the steps. Alternatively, the steps may be performed by a combination of hardware, software, and/or firmware. As such, FIG. 8 is an example of a computer system 800 with which embodiments of the present disclosure may be utilized. According to the present example, the computer system 800 includes an interconnect 802, at least one processor 804, at least one communication port 806, at least one main memory 808, at least one removable storage media 810, at least one read only memory 812, and at least one mass storage device 814.

The at least one processor 804 can be any known processor. The at least one communication port 806 can be or include, for example, any of an RS-232 port for use with a modem-based dialup connection, a 10/100 Ethernet port, or a Gigabit port using copper or fiber. The nature of the at least one communication port 806 may be chosen depending on a network such a Local Area Network (LAN), Wide Area Network (WAN), or any network to which the computer system 800 connects. The at least one main memory 808 can be Random Access Memory (RAM), or any other dynamic storage device(s) commonly known in the art. The at least one read only memory 812 can be any static storage device(s) such as Programmable Read Only Memory (PROM) chips for storing static information such as instructions for the at least one processor 804.

The at least one mass storage device 814 can be used to store information and instructions. For example, hard disks (such as magnetic disk drives or solid state drive using serial/parallel ATA or SCSI interfaces), an optical disc, an array of disks such as a Redundant Array of Independent Disks (RAID), or any other mass storage devices may be used. Interconnect 802 can be or include one or more buses, bridges, controllers, adapters, and/or point-to-point connections. Interconnect 802 communicatively couples the at least one processor 804 with the other memory, storage, and communication blocks. Interconnect 802 can be a PCI/PCI-X or SCSI based system bus depending on the storage devices used. The at least one removable storage media 810 can be any kind of external hard-drives, floppy drives, Compact Disc-Read Only Memory (CD-ROM), Compact Disc-Re-Writable (CD-RW), Digital Video Disc-Read Only Memory (DVD-ROM), Blu-Ray Disc Read Only Memory (BD-ROM), Blu-Ray Disc Recordable (BD-R), Blu-Ray Disc Recordable Erasable (BD-RE).

The components described above are meant to exemplify some types of possibilities. In no way should the aforementioned examples limit the disclosure, as they are only exemplary embodiments. The embodiments, structure, methods, etc. described herein, including those below and above, can be combined together in various ways.

Terminology

Brief definitions of terms, abbreviations, and phrases used throughout this application are given below.

The terms "connected", "coupled", and "communicatively coupled" and related terms are used in an operational sense and are not necessarily limited to a direct physical connection or coupling. Thus, for example, two devices may be coupled directly, or via one or more intermediary media or devices. As another example, devices may be coupled in such a way that information can be passed there between, while not sharing any physical connection with one another. Based on the disclosure provided herein, one of ordinary skill in the art will appreciate a variety of ways in which connection or coupling exists in accordance with the aforementioned definition.

The phrase "based on" does not mean "based only on," unless expressly specified otherwise. In other words, the phrase "based on" describes both "based only on" and "based at least on". Additionally, the term "and/or" means "and" or "or". For example, "A and/or B" can mean "A", "B", or "A and B". Additionally, "A, B, and/or C" can mean "A alone," "B alone," "C alone," "A and B," "A and C," "B and C" or "A, B, and C."

The phrases "in exemplary embodiments", "in example embodiments", "in some embodiments", "according to some embodiments", "in the embodiments shown", "in other embodiments", "embodiments", "in examples", "examples", "in some examples", "some examples" and the like generally mean the particular feature, structure, or characteristic following the phrase is included in at least one embodiment of the present disclosure, and may be included in more than one embodiment of the present disclosure. In addition, such phrases do not necessarily refer to the same embodiments or different embodiments.

If the specification states a component or feature "may," "can," "could," or "might" be included or have a characteristic, that particular component or feature is not required to be included or have the characteristic.

The term "responsive" includes completely or partially responsive.

The term "module" refers broadly to a software, hardware, or firmware (or any combination thereof) component. Modules are typically functional components that can generate useful data or other output using specified input(s). A module may or may not be self-contained. An application program (also called an "application") may include one or more modules, or a module can include one or more application programs.

The term "network" generally refers to a group of interconnected devices capable of exchanging information. A network may be as few as several personal computers on a Local Area Network (LAN) or as large as the Internet, a worldwide network of computers. As used herein, "network" is intended to encompass any network capable of transmitting information from one entity to another. In some cases, a network may be comprised of multiple networks, even multiple heterogeneous networks, such as one or more border networks, voice networks, broadband networks, financial networks, service provider networks, Internet Service Provider (ISP) networks, and/or Public Switched Telephone Networks (PSTNs), interconnected via gateways operable to facilitate communications between and among the various networks.

Also, for the sake of illustration, various embodiments of the present disclosure have herein been described in the context of computer programs, physical components, and logical interactions within modern computer networks. Importantly, while these embodiments describe various embodiments of the present disclosure in relation to modern computer networks and programs, the method and apparatus described herein are equally applicable to other systems, devices, and networks as one skilled in the art will appreciate. As such, the illustrated applications of the embodiments of the present disclosure are not meant to be limiting, but instead are examples. Other systems, devices, and networks to which embodiments of the present disclosure are applicable include, for example, other types of communication and computer devices and systems. More specifically, embodiments are applicable to communication systems, services, and devices such as cell phone networks and compatible devices. In addition, embodiments are applicable to all levels of computing from the personal computer to large network mainframes and servers.

In conclusion, the present disclosure provides novel systems, methods, and arrangements for securely splitting, distributing, and/or reconstructing keys. While detailed descriptions of one or more embodiments of the disclosure have been given above, various alternatives, modifications, and equivalents will be apparent to those skilled in the art without varying from the spirit of the disclosure. For example, while the embodiments described above refer to particular features, the scope of this disclosure also includes embodiments having different combinations of features and embodiments that do not include all of the described features. Accordingly, the scope of the present disclosure is intended to embrace all such alternatives, modifications, and variations as fall within the scope of the claims, together with all equivalents thereof. Therefore, the above description should not be taken as limiting.

Example Embodiments

Example 1 includes a system comprising: at least one processor; at least one memory communicatively coupled to the at least one processor; and wherein, when at least one encryption key needs to be generated to encrypt a key, the at least one processor is configured to: generate the at least one encryption key; encrypt the key using the at least one encryption key to generate an encrypted key; split the encrypted key and the at least one encryption key into at least one set of key components, wherein at least a subset of key components of the at least one set of key components can be used to reconstruct the encrypted key and the at least one encryption key; and erase the key from the at least one memory.

Example 2 includes the system of Example 1, wherein the at least one processor is configured to: combine the encrypted key and the at least one encryption key together before splitting the encrypted key and the at least one encryption key into the at least one set of key components.

Example 3 includes the system of any of Examples 1-2, wherein the at least one processor is configured to split the encrypted key and the at least one encryption key into at least one set of key components at least in part by being configured to: split the encrypted key into a first set of first key components, wherein at least a first subset of the first key components can be used to reconstruct the encrypted key, wherein the first set of key components are configured to be provided to a first plurality of users; and split the at least one encryption key into at least a second set of at least second key components, wherein at least a second subset of the at least second key components can be used to reconstruct the at least one encryption key, wherein the at least the second set of key components are configured to be provided to at least a second plurality of users.

Example 4 includes the system of Example 3, wherein the at least the second set of the at least second key components includes only a single set of key components; wherein the at least the second plurality of users includes only a single set of users; and wherein the at least the second set of key components are configured to be provided to the single set of users.

Example 5 includes the system of any of Examples 3-4, wherein the at least the second set of the at least second key components includes a plurality of sets of key components; wherein the at least the second plurality of users includes a plurality of sets of users; and wherein each set of key components of the plurality of sets of key components is configured to be provided to a corresponding set of users of the plurality of sets of users.

Example 6 includes the system of any of Examples 1-5, wherein, when the key needs to be generated, the at least one processor is configured to: generate the key before encrypting the key using the at least one encryption key to generate the encrypted key.

Example 7 includes the system of any of Examples 1-6, wherein the at least one processor is configured to encrypt the key by being configured to apply at least one exclusive or (XOR) operation to the key and the at least one encryption key.

Example 8 includes the system of any of Examples 1-7, wherein the encrypted key is configured to include a one in each bit position where bits in a corresponding bit position in both the key and the at least one encryption key are different; wherein the encrypted key is configured to include a zero in each bit position where bits in the corresponding bit position in both the key and the at least one encryption key are the same.

Example 9 includes the system of any of Examples 1-8, wherein prior to generating the key when the key needs to be generated, the at least one processor is configured to: block user logins into the system; verify that no users are logged into the system; and check that the system is not being implemented as a virtual machine.

Example 10 includes the system of Example 9, wherein the at least one processor is configured to block user logins into the system at least in part by being configured to: block secure shell (SSH) logins into the system.

Example 11 includes the system of any of Examples 1-10, wherein the at least one processor is configured to erase the key from the at least one memory using a DoD memory wipe.

Example 12 includes the system of any of Examples 1-11, further comprising: at least one network interface communicatively coupled to the at least one processor and configured to communicate with external computing devices, the at least one network interface configured to: receive the third subset of the first set of key components from the first subset of users using encrypted communication; and receive the fourth subset of the at least the second set of key components from the second subset of users using encrypted communication.

Example 13 includes the system of any of Examples 1-12, further comprising: at least one network interface communicatively coupled to the at least one processor and configured to communicate with external computing devices.

Example 14 includes the system of Example 13, wherein when the key needs to be generated, the at least one processor is further configured to: cause the at least one network interface to communicate the first set of key components to computing devices for the first plurality of users; and cause the at least one network interface to communicate the at least the second set of key components to computing devices for the second plurality of users.

Example 15 includes the system of Example 14, wherein at least one of the first set of key components and the at least the second set of key components are communicated to users in at least one of email, Short Message Service (SMS), Multimedia Messaging Service (MMS), instant messaging, push notification, push verify notification, polling a notification, pulling a notification, or by Bluetooth, Wi-Fi, or near field (NFC) transmission.

Example 16 includes the system of any of Examples 13-15, wherein when the key needs to be used, the at least one processor is configured to: when a third subset of the first set of key components is received from a first subset of users that can be used to reconstruct the encrypted key, reconstruct the encrypted key; when a fourth subset of the at least the second set of key components is received from a second subset of users that can be used to reconstruct the at least one encryption key, reconstruct the at least one encryption key; when the encrypted key and the at least one encryption key have both been reconstructed, decrypt the encrypted key into the key using the at least one encryption key.

Example 17 includes the system of Example 16, wherein the first plurality of users are the same plurality of users as the second plurality of users.

Example 18 includes the system of any of Examples 13-17, wherein when the key needs to be used, the at least one processor is configured to: cause a request for key components to be communicated to users using the at least one network interface; when a third subset of the first set of key components is received from a first subset of users that can be used to reconstruct the encrypted key, reconstruct the encrypted key; when a fourth subset of the at least the second set of key components is received from a second subset of users that can be used to reconstruct the at least one encryption key, reconstruct the at least one encryption key; when the encrypted key and the at least one encryption key have both been reconstructed, decrypt the encrypted key using the at least one encryption key.

Example 19 includes the system of Example 18, wherein the request for key components is communicated to users using encrypted communication; wherein the third subset of the first set of key components is received from the first subset of users using encrypted communication; and wherein the fourth subset of the at least the second set of key components is received from the second subset of users using encrypted communication.

Example 20 includes the system of any of Examples 18-19, wherein the request for key components is communicated to users in at least one of email, Short Message Service (SMS), Multimedia Messaging Service (MMS), instant messaging, push notification, push verify notification, polling a notification, pulling a notification, or by Bluetooth, Wi-Fi, or near field (NFC) transmission.

Example 21 includes the system of any of Examples 18-20, wherein the first plurality of users are the same plurality of users as the second plurality of users; and wherein the first subset of users is the same subset of users as the second subset of users.

Example 22 includes the system of any of Examples 1-21, wherein the at least one processor is configured to split the encrypted key and the at least one encryption key into at least one set of key components through at least one of polynomial interpolation or Shamir secret sharing.

Example 23 includes the system of any of Examples 1-22, wherein at least one of the at least one encryption key and the key is a private key used in asymmetrical cryptography.

Example 24 includes a system comprising: at least one processor; at least one memory communicatively coupled to the at least one processor; at least one network interface communicatively coupled to the at least one processor and configured to communicate with external computing devices; and wherein the at least one processor is configured to: generate the private key; generate at least one encryption key; apply at least one exclusive or (XOR) operation to the private key and the at least one encryption key to encrypt the private key using the encryption key to generate an encrypted private key; split the encrypted private key and the at least one encryption key into at least one set of key components, wherein at least a subset of key components of the at least one set of key components can be used to reconstruct the encrypted key and the at least one encryption key; and erase the key from the at least one memory.

Example 25 includes the system of Example 24, wherein the at least one processor is configured to: combine the encrypted private key and the at least one encryption key together before splitting the encrypted private key and the at least one encryption key into the at least one set of key components.

Example 26 includes the system of any of Examples 1-25, wherein the at least one processor is configured to split the encrypted key and the at least one encryption key into at least one set of key components at least in part by being configured to: split the encrypted private key into a first set of first key components, wherein at least a first subset of the first key components can be used to reconstruct the encrypted private key, wherein the first set of key components are configured to be provided to a first plurality of users; and split the at least one encryption key into at least a second set of at least second key components, wherein at least a second subset of the at least the second key components can be used to reconstruct the at least one encryption key, wherein the at least the second set of key components are configured to be provided to at least a second plurality of users.

Example 27 includes the system of any of Examples 24-26, wherein the at least one processor is further configured to: cause the at least one network interface to communicate the first set of key components to computing devices for the first plurality of users; and cause the at least one network interface to communicate the at least the second set of key components to computing devices for the second plurality of users.

Example 28 includes the system of Example 27, wherein at least one of the first set of key components and the at least the second set of key components are communicated to users in at least one of email, Short Message Service (SMS), Multimedia Messaging Service (MMS), instant messaging, push notification, push verify notification, polling a notification, pulling a notification, or by Bluetooth, Wi-Fi, or near field (NFC) transmission.

Example 29 includes the system of any of Examples 24-28, wherein when the private key needs to be used, the at least one processor is configured to: when a third subset of the first set of key components is received from a first subset of users that can be used to reconstruct the encrypted private key, reconstruct the encrypted private key; when a fourth subset of the at least the second set of key components is received from a second subset of users that can be used to reconstruct the at least one encryption key, reconstruct the at least one encryption key; and when the encrypted private key and the encryption key have both been reconstructed, apply at least one exclusive or (XOR) operation to the encrypted private key and the at least one encryption key to decrypt the encrypted private key using the at least one encryption key.

Example 30 includes the system of any of Examples 24-29, wherein when the private key needs to be used, the at least one processor is configured to: cause a request for key components to be communicated to users using the at least one network interface; when a third subset of the first set of key components is received from a first subset of users that can be used to reconstruct the encrypted private key, reconstruct the encrypted private key; when a fourth subset of the at least the second set of key components is received from a second subset of users that can be used to reconstruct the at least one encryption key, reconstruct the at least one encryption key; when the encrypted private key and the at least one encryption key have both been reconstructed, decrypt the encrypted private key using the at least one encryption key.

Example 31 includes the system of Example 30, wherein the request for key components is communicated to users in at least one of email, Short Message Service (SMS), Multimedia Messaging Service (MMS), instant messaging, push notification, push verify notification, polling a notification, pulling a notification, or by Bluetooth, Wi-Fi, or near field (NFC) transmission.

Example 32 includes the system of any of Examples 24-31, wherein the at least one processor is configured to split the encrypted private key and the at least one encryption key into at least one set of key components through at least one of polynomial interpolation or Shamir secret sharing.

Example 33 includes a system comprising: at least one processor; at least one memory communicatively coupled to the at least one processor; and wherein when an encryption key needs to be used that is encrypted as an encrypted key, the at least one processor is configured to: receive at least one set of key components from at least a subset of users that can be used to reconstruct the encrypted key and at least one encryption key used to decrypt the key from the encrypted key; when the at least the one set of key components is received from the at least the subset of users that can be used to reconstruct the encrypted key and the at least one encryption key, reconstruct the encrypted key and the at least one encryption key; and when the encrypted key and the at least one encryption key have both been reconstructed, decrypt the encrypted key into the key using the at least one encryption key.

Example 34 includes the system of Example 33, wherein the at least one processor is configured to: receive the at least one set of key components from the at least the subset of users at least in part by being configured to receive a single set of key components; reconstruct a combined string, including both the encrypted key and the at least one encryption key, from the single set of key components; extracting the encrypted key and the at least one encryption key from the combined string to be used to decrypt the encrypted key into the key using the at least one encryption key.

Example 35 includes the system of any of Examples 33-34, wherein the at least one processor is configured to: receive at least one set of key components from at least a subset of users that can be used to reconstruct the encrypted key and at least one encryption key used to decrypt the key from the encrypted key at least in part by being configured to: receive a first subset of a first set of key components from a first subset of users that can be used to reconstruct the encrypted key; receive at least a second subset of key components of at least a second set of key components from at least a second subset of users that can be used to reconstruct at least one encryption key used to decrypt the key from the encrypted key; and reconstruct the encrypted key and the at least one encryption key at least in part by being configured to: when the first subset of the first key components is received from the first subset of users, reconstruct the encrypted key; and when the at least the second subset of key components of the at least the second key components is received from the at least the second subset of users, reconstruct the at least one encryption key.

Example 36 includes the system of any of Examples 33-35, wherein the at least the second set of key components of the at least the second key components includes only a single set of key components; wherein the at least the second subset of users includes only a single subset of users; and wherein the at least the second set of key components are configured to be received from the single subset of users.

Example 37 includes the system of any of Examples 33-36, wherein the at least the second set of key components of the at least second key components includes a plurality of sets of key components; wherein the at least the second subset of users includes a plurality of subsets of users; and wherein each set of key components of the plurality of sets of key components is configured to be received from a corresponding subset of users of the plurality of subsets of users.

Example 38 includes the system of any of Examples 33-37, wherein the at least one processor is configured to decrypt the encrypted key by being configured to apply at least one exclusive or (XOR) operation to the encrypted key and the at least one encryption key.

Example 39 includes the system of any of Examples 33-38, wherein the key is configured to include a one in each bit position where bits in a corresponding bit position in both the encrypted key and the at least one encryption key are different; wherein the key is configured to include a zero in each bit position where bits in the corresponding bit position in both the encrypted key and the at least one encryption key are the same.

Example 40 includes the system of any of Examples 33-39, wherein when the key needs to be used, the at least one processor is further configured to: erase the key from the at least one memory after use.

Example 41 includes the system of Example 40, wherein the at least one processor is configured to erase the key from the at least one memory after use using a DoD memory wipe.

Example 42 includes the system of any of Examples 33-41, wherein prior to reconstructing the key when the key needs to be generated, the at least one processor is configured to: block user logins into the system; verify that no users are logged into the system; and check that the system is not being implemented as a virtual machine.

Example 43 includes the system of Example 42, wherein the at least one processor is configured to block user logins into the system at least in part by being configured to: block secure shell (SSH) logins into the system.

Example 44 includes the system of any of Examples 33-43, further comprising at least one network interface communicatively coupled to the at least one processor and configured to communicate with external computing devices.

Example 45 includes the system of Example 44, wherein when the key needs to be used, the at least one processor is further configured to: cause a request for key components from to be communicated to users using the at least one network interface.

Example 46 includes the system of Example 45, wherein the request for key components is communicated to users using encrypted communication; wherein the first subset of the first key components is received from the first subset of users using encrypted communication; and wherein the at least the second subset of key components of the at least the second key components is received from the at least the second subset of users using encrypted communication.

Example 47 includes the system of any of Examples 45-46, wherein the request for key components is communicated to users in at least one of email, Short Message Service (SMS), Multimedia Messaging Service (MMS), instant messaging, push notification, push verify notification, polling a notification, pulling a notification, or by Bluetooth, Wi-Fi, or near field (NFC) transmission.

Example 48 includes the system of any of Examples 33-47, wherein the first subset of users is the same subset of users as the second plurality of subsets of users.

Example 49 includes the system of any of Examples 33-48, wherein the at least one processor is configured to reconstruct the encrypted key and the at least one encryption key through at least one of polynomial interpolation or Shamir secret sharing.

Example 50 includes the system of any of Examples 33-49, wherein at least one of the key and the at least one encryption key is a private key used in asymmetrical cryptography.

Example 51 includes a system comprising: at least one processor; at least one memory communicatively coupled to the at least one processor; at least one network interface communicatively coupled to the at least one processor and configured to communicate with external computing devices; and wherein when a private key needs to be used, the at least one processor is configured to: cause a request for key components to be communicated to users using the at least one network interface; receive at least one set of key components from at least a subset of users that can be used to reconstruct an encrypted private key and at least one encryption key used to decrypt the private key from the encrypted private key; when the at least the one set of key components is received from the at least the subset of users that can be used to reconstruct the encrypted private key and the at least one encryption key, reconstruct the encrypted private key and the at least one encryption key; when the encrypted private key and the at least one encryption key both have been reconstructed, apply at least one exclusive or (XOR) operation to the encrypted private key and the at least one encryption key to decrypt the encrypted private key using the at least one encryption key; and erase the private key from the at least one memory after use.

Example 52 includes the system of Example 51, wherein the at least one processor is configured to: receive the at least one set of key components from the at least the subset of users at least in part by being configured to receive a single set of key components; reconstruct a combined string, including both the encrypted private key and the at least one encryption key, from the single set of key components; extracting the encrypted private key and the at least one encryption key from the combined string to be used to decrypt the encrypted private key into the private key using the at least one encryption key.

Example 53 includes the system of any of Examples 51-52, wherein the at least one processor is configured to: receive at least one set of key components from at least a subset of users that can be used to reconstruct an encrypted private key and at least one encryption key used to decrypt the private key from the encrypted private key at least in part by being configured to: receive a first subset of a first set of key components from a first subset of users that can be used to reconstruct the encrypted private key; receive at least a second subset of key components of at least a second set of key components from at least a second subset of users that can be used to reconstruct at least one encryption key used to decrypt the key from the encrypted key; and reconstruct the encrypted private key and the at least one encryption key at least in part by being configured to: when the first subset of the first key components is received from the first subset of users, reconstruct the encrypted private key; and when the at least the second subset of key components of the at least the second key components is received from the at least the second subset of users, reconstruct the at least one encryption key.

Example 54 includes the system of Example 53, wherein the request for key components is communicated to users using encrypted communication; wherein the first subset of the first key components is received from the first subset of users using encrypted communication; and wherein the at least the second subset of key components of the at least the second key components is received from the at least the second subset of users using encrypted communication.

Example 55 includes the system of any of Examples 51-54, wherein the request for key components is communicated to users in at least one of email, Short Message Service (SMS), Multimedia Messaging Service (MMS), instant messaging, push notification, push verify notification, polling a notification, pulling a notification, or by Bluetooth, Wi-Fi, or near field (NFC) transmission.

Example 56 includes the system of any of Examples 51-55, wherein the at least one processor is configured to reconstruct the encrypted key and the at least one encryption key through at least one of polynomial interpolation or Shamir secret sharing.

What is claimed is:

1. A system comprising:
   at least one processor;
   at least one memory communicatively coupled to the at least one processor; and
   wherein, when at least one encryption key needs to be generated to encrypt a key, the at least one processor is configured to:
   generate the at least one encryption key;
   encrypt the key using the at least one encryption key to generate an encrypted key;
   split the encrypted key into a first set of first key components, wherein at least a first subset of the first set of first key components can be used to reconstruct the encrypted key, wherein the first set of first key components are configured to be provided to a first plurality of users;
   split the at least one encryption key into at least a second set of second key components, wherein at least a second subset of the second set of second key components can be used to reconstruct the at least one encryption key, wherein the at least the second set of second key components are configured to be provided to a second plurality of users; and
   erase the key from the at least one memory.

2. The system of claim 1, wherein the at least one processor is configured to:
   combine the encrypted key and the at least one encryption key together before splitting the encrypted key into the first set of first key components and the at least one encryption key into the at least the second set of second key components.

3. The system of claim 1, wherein the at least the second set of second key components includes only a single set of key components;
   wherein the second plurality of users includes only a single set of users; and
   wherein the second set of second key components are configured to be provided to the single set of users.

4. The system of claim 1, wherein the second set of second key components includes a plurality of sets of key components;
   wherein the second plurality of users includes a plurality of sets of users; and
   wherein each set of key components of the plurality of sets of key components is configured to be provided to a corresponding set of users of the plurality of sets of users.

5. The system of claim 1, wherein, when the key needs to be generated, the at least one processor is configured to:
   generate the key before encrypting the key using the at least one encryption key to generate the encrypted key.

6. The system of claim 1, wherein the at least one processor is configured to encrypt the key by being configured to apply at least one exclusive or (XOR) operation to the key and the at least one encryption key.

7. The system of claim 1, further comprising:
   at least one network interface communicatively coupled to the at least one processor and configured to communicate with external computing devices, the at least one network interface configured to:
   cause the at least one network interface to communicate the first set of first key components to first external computing devices for the first plurality of users; and
   cause the at least one network interface to communicate the at least the second set of second key components to second external computing devices for the second plurality of users.

8. The system of claim 7, wherein at least one of the first set of first key components and the at least the second set of second key components are communicated to users in at least one of email, Short Message Service (SMS), Multimedia Messaging Service (MMS), instant messaging, push notification, push verify notification, polling a notification, pulling a notification, or by Bluetooth, WiFi, or near field (NFC) transmission.

9. The system of claim 1, wherein the at least one processor is configured to split the encrypted key into the first set of first key components and the at least one encryption key into the at least the second set of second key components through at least one of polynomial interpolation or Shamir secret sharing.

10. A system comprising:
    at least one processor;
    at least one memory communicatively coupled to the at least one processor;
    at least one network interface communicatively coupled to the at least one processor and configured to communicate with external computing devices; and
    wherein the at least one processor is configured to:
    generate a private key;
    generate at least one encryption key;
    apply at least one exclusive or (XOR) operation to the private key and the at least one encryption key to encrypt the private key using the at least one encryption key to generate an encrypted private key;
    split the encrypted private key into a first set of first key components, wherein at least a first subset of the first set of first key components can be used to reconstruct the encrypted private key, wherein the first set of first key components are configured to be provided to a first plurality of users;
    split the at least one encryption key into at least a second set of second key components, wherein at least a second subset of the second set of second key components can be used to reconstruct the at least one encryption key, wherein the at least the second set of second key components are configured to be provided to a second plurality of users; and erase the at least one encryption key from the at least one memory.

11. The system of claim 10, wherein the at least one processor is configured to:

combine the encrypted private key and the at least one encryption key together before splitting the encrypted private key into the first set of first key components and the at least one encryption key into the at least the second set of second key components.

12. The system of claim 10, wherein the at least one processor is configured to split the encrypted private key into the first set of first key components and the at least one encryption key into the at least the second set of second key components through at least one of polynomial interpolation or Shamir secret sharing.

13. A system comprising:

at least one processor;

at least one memory communicatively coupled to the at least one processor;

at least one network interface communicatively coupled to the at least one processor and configured to communicate with external computing devices; and wherein when an encryption key needs to be used that is encrypted as an encrypted key, the at least one processor is configured to:

cause a request for key components to be communicated to users using the at least one network interface, wherein the request for key components is communicated to users in at least one of email, Short Message Service (SMS), Multimedia Messaging Service (MMS), instant messaging, push notification, push verify notification, polling a notification, pulling a notification, or by Bluetooth, WiFi, or near field (NFC) transmission;

receive at least one set of key components from at least a subset of users that can be used to reconstruct the encrypted key and at least one encryption key used to decrypt the encrypted key into a key;

when the at least one set of key components is received from the at least the subset of users that can be used to reconstruct the encrypted key and the at least one encryption key, reconstruct the encrypted key and the at least one encryption key; and when the encrypted key and the at least one encryption key have both been reconstructed, decrypt the encrypted key into the key using the at least one encryption key.

14. The system of claim 13, wherein the at least one processor is configured to:

receive the at least one set of key components from the at least the subset of users at least in part by being configured to receive a single set of key components;

reconstruct a combined string, including both the encrypted key and the at least one encryption key, from the single set of key components; and extracting the encrypted key and the at least one encryption key from the combined string to be used to decrypt the encrypted key into the key using the at least one encryption key.

15. The system of claim 13, wherein the at least one processor is configured to:

receive the at least one set of key components from the at least the subset of users that can be used to reconstruct the encrypted key and the at least one encryption key used to decrypt the encrypted key into the key at least in part by being configured to:

receive a first subset of a first set of first key components from a first subset of users that can be used to reconstruct the encrypted key;

receive at least a second subset of at least a second set of second key components from at least a second subset of users that can be used to reconstruct the at least one encryption key used to decrypt the encrypted key into the key; and reconstruct the encrypted key and the at least one encryption key at least in part by being configured to:

when the first subset of the first set of first key components is received from the first subset of users, reconstruct the encrypted key; and when the at least the second subset of the at least the second set of second key components is received from the at least the second subset of users, reconstruct the at least one encryption key.

16. The system of claim 15, wherein the at least the second set of second key components includes only a single set of key components;

wherein the at least the second subset of users includes only a single subset of users; and wherein the at least the second set of second key components are configured to be received from the single subset of users.

17. The system of claim 15, wherein the at least the second set of second key components includes a plurality of sets of key components;

wherein the at least the second subset of users includes a plurality of subsets of users; and wherein each set of key components of the plurality of sets of key components is configured to be received from a corresponding subset of users of the plurality of subsets of users.

18. The system of claim 15, wherein the first subset of users is a same subset of users as the second subset of users.

19. The system of claim 13, wherein the at least one processor is configured to decrypt the encrypted key by being configured to apply at least one exclusive or (XOR) operation to the encrypted key and the at least one encryption key.

20. The system of claim 13, wherein the at least one processor is configured to reconstruct the encrypted key and the at least one encryption key through at least one of polynomial interpolation or Shamir secret sharing.

21. A system comprising:

at least one processor;

at least one memory communicatively coupled to the at least one processor;

at least one network interface communicatively coupled to the at least one processor and configured to communicate with external computing devices; and wherein when a private key needs to be used, the at least one processor is configured to:

cause a request for key components to be communicated to users using the at least one network interface, wherein the request for key components is communicated to users in at least one of email, Short Message Service (SMS), Multimedia Messaging Service (MMS), instant messaging, push notification, push verify notification, polling a notification, pulling a notification, or by Bluetooth, WiFi, or near field (NFC) transmission;

receive at least one set of key components from at least a subset of users that can be used to reconstruct an encrypted private key and at least one encryption key used to decrypt the private key from the encrypted private key;

when the at least one set of the key components is received from the at least the subset of users that can be used to reconstruct the encrypted private key and the at least one encryption key, reconstruct the encrypted private key and the at least one encryption key;

when the encrypted private key and the at least one encryption key both have been reconstructed, apply at least one exclusive or (XOR) operation to the encrypted private key and the at least one encryption key to decrypt the encrypted private key using the at least one encryption key; and erase the private key from the at least one memory after use.

22. The system of claim 21, wherein the at least one processor is configured to:

receive the at least one set of the key components from the at least the subset of users that can be used to reconstruct the encrypted private key and the at least one encryption key used to decrypt the private key from the encrypted private key at least in part by being configured to:

receive a first subset of a first set of key components from a first subset of users that can be used to reconstruct the encrypted private key;

receive at least a second subset of a second set of key components from at least a second subset of users that can be used to reconstruct at least one encryption key used to decrypt the encrypted private key into the key; and reconstruct the encrypted private key and the at least one encryption key at least in part by being configured to:

when the first subset of the first set of the first key components is received from the first subset of users, reconstruct the encrypted private key; and when the at least the second subset of the second set of key components is received from the at least the second subset of users, reconstruct the at least one encryption key.

23. The system of claim 21, wherein the at least one processor is configured to reconstruct the encrypted private key and the at least one encryption key through at least one of polynomial interpolation or Shamir secret sharing.

24. A system comprising:
at least one processor;
at least one memory communicatively coupled to the at least one processor; and
wherein, when at least one encryption key needs to be generated to encrypt a key, the at least one processor is configured to:
generate the at least one encryption key;
encrypt the key using the at least one encryption key to generate an encrypted key;
combine the encrypted key and the at least one encryption key together;
split the encrypted key and the at least one encryption key into at least one set of key components, wherein at least a subset of key components of the at least one set of key components can be used to reconstruct the encrypted key and the at least one encryption key; and
erase the key from the at least one memory.

25. A system comprising:
at least one processor;
at least one memory communicatively coupled to the at least one processor;
at least one network interface communicatively coupled to the at least one processor and configured to communicate with external computing devices; and
wherein the at least one processor is configured to:
generate a private key;
generate at least one encryption key;
apply at least one exclusive or (XOR) operation to the private key and the at least one encryption key to encrypt the private key using the at least one encryption key to generate an encrypted private key;
combine the encrypted private key and the at least one encryption key together;
split the encrypted private key and the at least one encryption key into at least one set of key components, wherein at least a subset of key components of the at least one set of key components can be used to reconstruct the encrypted private key and the at least one encryption key; and
erase the at least one encryption key from the at least one memory.

26. A system comprising:
at least one processor;
at least one memory communicatively coupled to the at least one processor; and
wherein when an encryption key needs to be used that is encrypted as an encrypted key, the at least one processor is configured to:
receive a single set of key components from at least a subset of users that can be used to reconstruct the encrypted key and at least one encryption key used to decrypt the encrypted key into a key;
reconstruct a combined string, including both the encrypted key and the at least one encryption key, from the single set of key components;
extract the encrypted key and the at least one encryption key from the combined string; and
when the encrypted key and the at least one encryption key have both been reconstructed, decrypt the encrypted key into the key using the at least one encryption key.

27. A system comprising:
at least one processor;
at least one memory communicatively coupled to the at least one processor; and
wherein when an encrypted key needs to be used, the at least one processor is configured to:
receive a first subset of a first set of first key components from a first subset of users that can be used to reconstruct the encrypted key;
receive at least a second subset of a second single set of key components from at least a second subset of users that can be used to reconstruct at least one encryption key used to decrypt the encrypted key into a decrypted key;
when the first subset of the first set of first key components is received from the first subset of users, reconstruct the encrypted key; and
when the at least the second subset of the at least the second set of second key components is received from the at least the second subset of users, reconstruct the at least one encryption key; and
when the encrypted key and the at least one encryption key have both been reconstructed, decrypt the encrypted key into the decrypted key using the at least one encryption key.

28. A system comprising:
at least one processor;
at least one memory communicatively coupled to the at least one processor; and
wherein when an encrypted key needs to be used, the at least one processor is configured to:
  receive a first subset of a first set of first key components from a first subset of users that can be used to reconstruct the encrypted key;
  receive at least a second subset of at least a second set of second key components from at least a second subset of users that can be used to reconstruct at least one encryption key used to decrypt the encrypted key into a decrypted key, wherein the at least the second set of second key components includes a plurality of sets of key components, wherein the at least the second subset of users includes a plurality of subsets of users, wherein each set of key components of the plurality of sets of key components is configured to be received from a corresponding subset of users of the plurality of subsets of users;
  when the first subset of the first set of first key components is received from the first subset of users, reconstruct the encrypted key;
  when the at least the second subset of the at least the second set of second key components is received from the at least the second subset of users, reconstruct the at least one encryption key; and
  when the encrypted key and the at least one encryption key have both been reconstructed, decrypt the encrypted key into the decrypted key using the at least one encryption key.

29. A system comprising:
at least one processor;
at least one memory communicatively coupled to the at least one processor;
at least one network interface communicatively coupled to the at least one processor and configured to communicate with external computing devices; and
wherein when a private key needs to be used, the at least one processor is configured to:
  cause a request for key components to be communicated to users using the at least one network interface, wherein the request for key components is communicated to users in at least one of email, Short Message Service (SMS), Multimedia Messaging Service (MMS), instant messaging, push notification, push verify notification, polling a notification, pulling a notification, or by Bluetooth, WiFi, or near field (NFC) transmission;
  receive at least one set of key components from at least a subset of users that can be used to reconstruct an encrypted private key and at least one encryption key used to decrypt the private key from the encrypted private key;
  when the at least one set of the key components is received from the at least the subset of users that can be used to reconstruct the encrypted private key and the at least one encryption key, reconstruct the encrypted private key and the at least one encryption key;
  when the encrypted private key and the at least one encryption key both have been reconstructed, apply at least one exclusive or (XOR) operation to the encrypted private key and the at least one encryption key to decrypt the encrypted private key using the at least one encryption key; and
  erase the private key from the at least one memory after use.

* * * * *